US012707271B2

(12) United States Patent
Sharma et al.

(10) Patent No.: US 12,707,271 B2
(45) Date of Patent: Aug. 11, 2026

(54) METHOD AND SYSTEM FOR DESIGNING SECURITY PROTOCOL FOR 6G NETWORK ARCHITECTURE

(71) Applicant: Samsung Electronics Co., Ltd., Suwon-si (KR)

(72) Inventors: Neha Sharma, Karnataka (IN); Anshuman Nigam, Karnataka (IN); Rajavelsamy Rajadurai, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 493 days.

(21) Appl. No.: 18/322,857

(22) Filed: May 24, 2023

(65) Prior Publication Data

US 2023/0413059 A1 Dec. 21, 2023

Related U.S. Application Data

(63) Continuation of application No. PCT/KR2023/006912, filed on May 22, 2023.

(30) Foreign Application Priority Data

May 23, 2022 (IN) ............................. 202241029500
May 10, 2023 (IN) ............................. 202241029500

(51) Int. Cl.
*H04W 12/63* (2021.01)
*H04W 12/041* (2021.01)
*H04W 12/10* (2021.01)

(52) U.S. Cl.
CPC ......... *H04W 12/63* (2021.01); *H04W 12/041* (2021.01); *H04W 12/10* (2013.01)

(58) Field of Classification Search
CPC . H04W 12/033; H04W 12/04; H04W 12/041; H04W 12/10; H04W 12/106; H04W 12/63; H04W 88/085
See application file for complete search history.

(56) References Cited

U.S. PATENT DOCUMENTS 10,820,359 B2 * 10/2020 Tandon ................. H04L 63/029
11,457,387 B2 * 9/2022 Sharma ............ H04W 12/0431
(Continued)

FOREIGN PATENT DOCUMENTS

WO 2021/096410 5/2021
WO 2022/031556 2/2022

OTHER PUBLICATIONS

Jiyoon Kim et al., MoTH: Mobile Terminal Handover Security Protocol for HUB Switching Based on 5G and Beyond (5GB) P2MP Backhaul Environment, in IEEE Internet of Things Journal, vol. 9, No. 16, Aug. 15, 2022 (Year: 2022).*
(Continued)

*Primary Examiner* — Sharon S Lynch
(74) *Attorney, Agent, or Firm* — NIXON & VANDERHYE P.C.

(57) ABSTRACT

The present disclosure relates to a 5G communication system or a 6G communication system for supporting higher data rates beyond a 4G communication system such as long term evolution (LTE).
The present disclosure provides a system and method for security protocol implemented in a communication network. The method performed by a first network entity includes determining based on a HUB being in a trusted area or in a non-trusted area, whether one or more network functions (NFs) are configured to perform security operations based on a generation of a message by a corresponding one or more NFs. Determining, based on a result of the determination that one or more NFs are not configured to perform
(Continued)

Key generation mechanism and Techniques for 6G architecture
HUB is in trusted area
HUB is not in trusted area
HUB and CU-UP will perform control and user plane security
DU and CU-UP will perform control and user plane security
612,614
HUB and NF both will perform control plane security and CU-UP will perform user plane security
NF will perform control plane security and CU-UP will perform user plane security
Each NF will perform control plane security and CU-UP will perform user plane security
Single NF will perform control plane security and CU-UP will perform user plane security
Techniques for Key generation at NW & UE
606,608
Techniques for Key generation at NW & UE
KHUB, KHUBint, KHUBenc, KUPint and KUPenc.
KNF, KDU, KDUint, KDUenc, KUPint and KUPenc
KNF,KNFint,KNFenc, KHUB, KHUBint, KHUBenc, KUPint and KUPenc
KNF,KNFint,KNFenc, KUPint and KUPenc
KNF1-n,KNFint,KNFenc, KUPint and KUPenc
KNF,KNFint,KNFenc, KUPint and KUPenc
Option 1
Option 4
Option 2
Option 3
Option 5
Option 6 the security operation, one or more network entities that are configured to perform the security operation, wherein the one or more network entities comprises at least one of the HUB, a Central Unit User Plane (CU-UP), and a Distributed Unit (DU), wherein a plurality of security keys are generated by the determined one or more network entities, and wherein the generated plurality of security keys is shared with a user equipment (UE).

12 Claims, 29 Drawing Sheets

(56) References Cited

U.S. PATENT DOCUMENTS 11,617,077 B2 * 3/2023 Kolekar .................. H04W 8/24 713/181
11,765,578 B2 * 9/2023 Wu ....................... H04W 12/10 726/1
11,785,510 B2 * 10/2023 Sharma ............. H04W 12/0433 455/410
12,225,377 B2 * 2/2025 Lehtovirta .......... H04W 12/102
2020/0029212 A1 1/2020 Lee et al.
2020/0100102 A1 * 3/2020 Xu ...................... H04W 12/033
2020/0359208 A1 * 11/2020 Wu ..................... H04W 88/085
2021/0021994 A1 * 1/2021 Kolekar .................. H04W 8/24
2022/0030425 A1 1/2022 Rajadura et al.
2022/0394473 A1 * 12/2022 Lehtovirta .............. H04W 8/06
2022/0394567 A1 * 12/2022 Sharma ............... H04W 12/033
2025/0150823 A1 * 5/2025 Castellanos Zamora .................... H04L 63/0823

OTHER PUBLICATIONS

Indian Office Action issued Feb. 27, 2024 in corresponding Indian Patent Application No. 202241029500.

Search Report and Written Opinion dated Aug. 4, 2023 issued in International Patent Application No. PCT/KR2023/006912.

3GPP TS 33.501 3rd Generation Partnership Project, Security architecture and procedures for 5G system, Technical Specification Group Services and System Aspects, Mar. 2022, 293 pages, V17.5.0.

3GPP TS 23.501 3rd Generation Partnership Project, System architecture for the 5G System (5GS), Technical Specification Group Services and System Aspects, Mar. 2022, 567 pages, V17.4.0.

Indian Notice of Hearing dated Oct. 6, 2025 issued in Indian Patent Application No. 202241029500 and English translation, 3 pp.

* cited by examiner

FIG. 1
(RELATED ART)

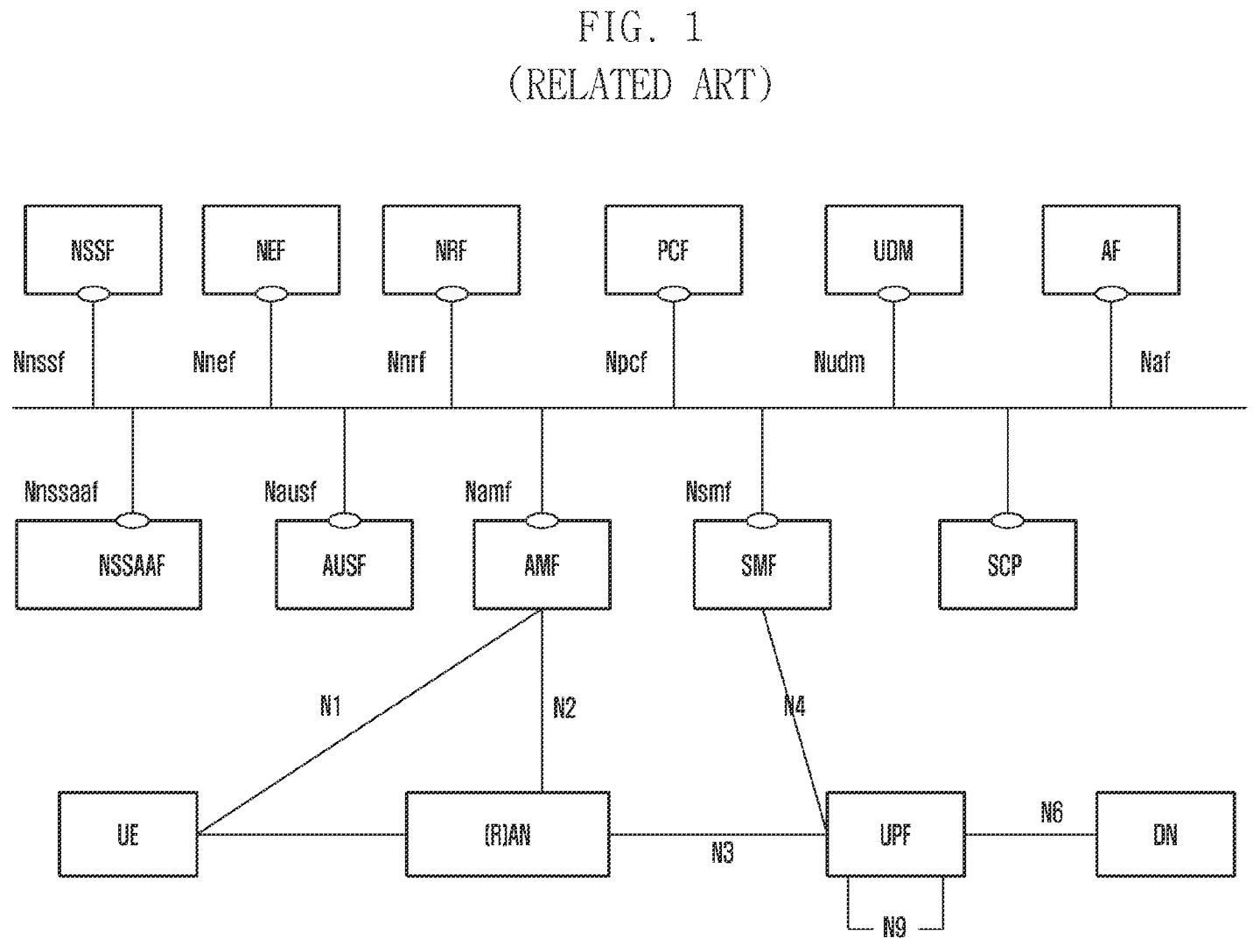

NSSF Nnssf
NEF Nnef
NRF Nnrf
PCF Npcf
UDM Nudm
AF Naf
NSSAAF Nnssaaf
AUSF Nausf
AMF Namf
SMF Nsmf
SCP
UE
(R)AN
UPF
DN
N1 N2 N3 N4 N6 N9

Figure 7A:
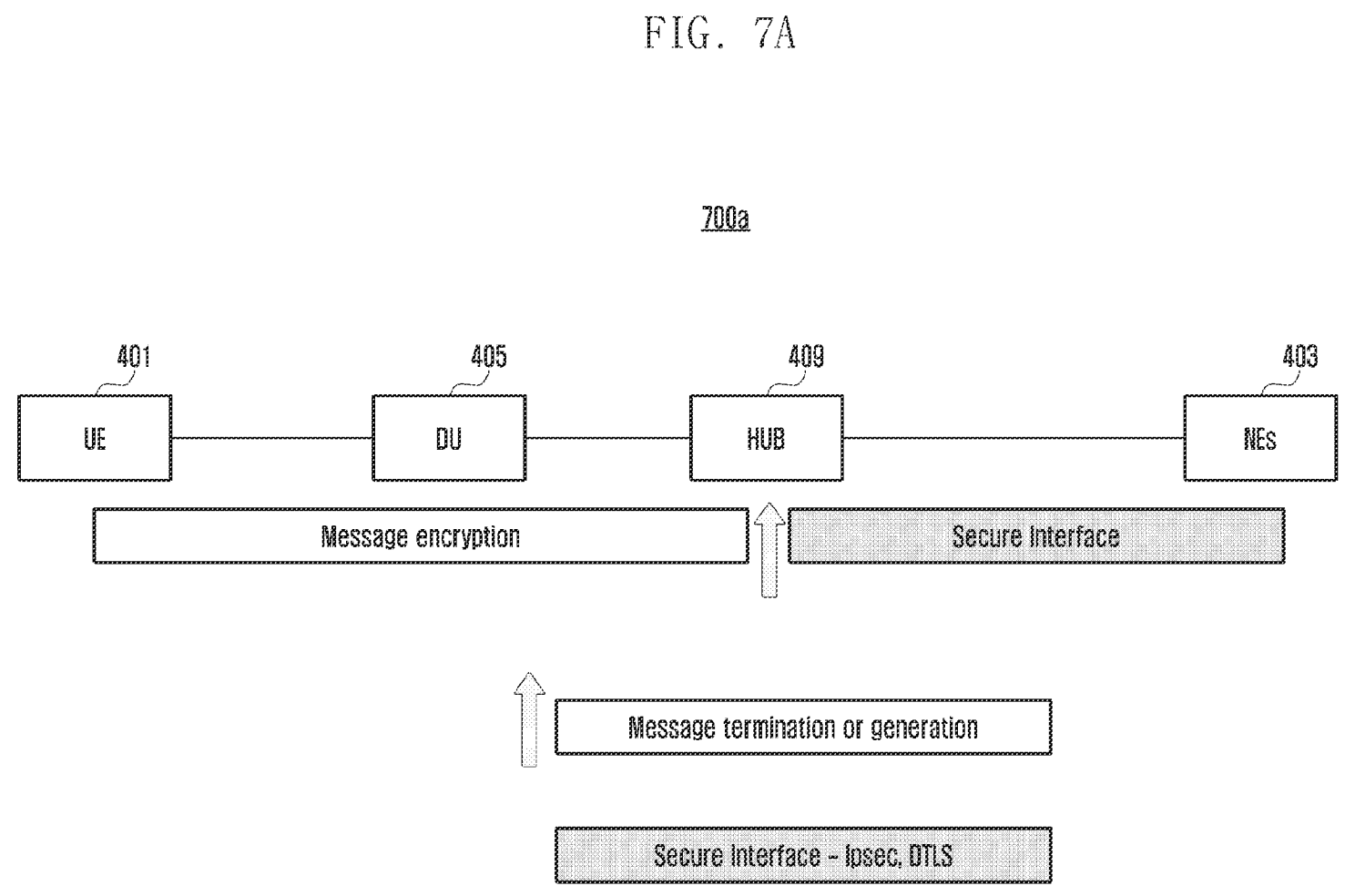

409 HUB

403 NES

Message encryption

Secure Interface

Message termination or generation

Secure Interface - Ipsec, DTLS

409 HUB

403 NEs

Message encryption

Secure Interface

409 HUB

403 NES

Message encryption

Figure 7E:
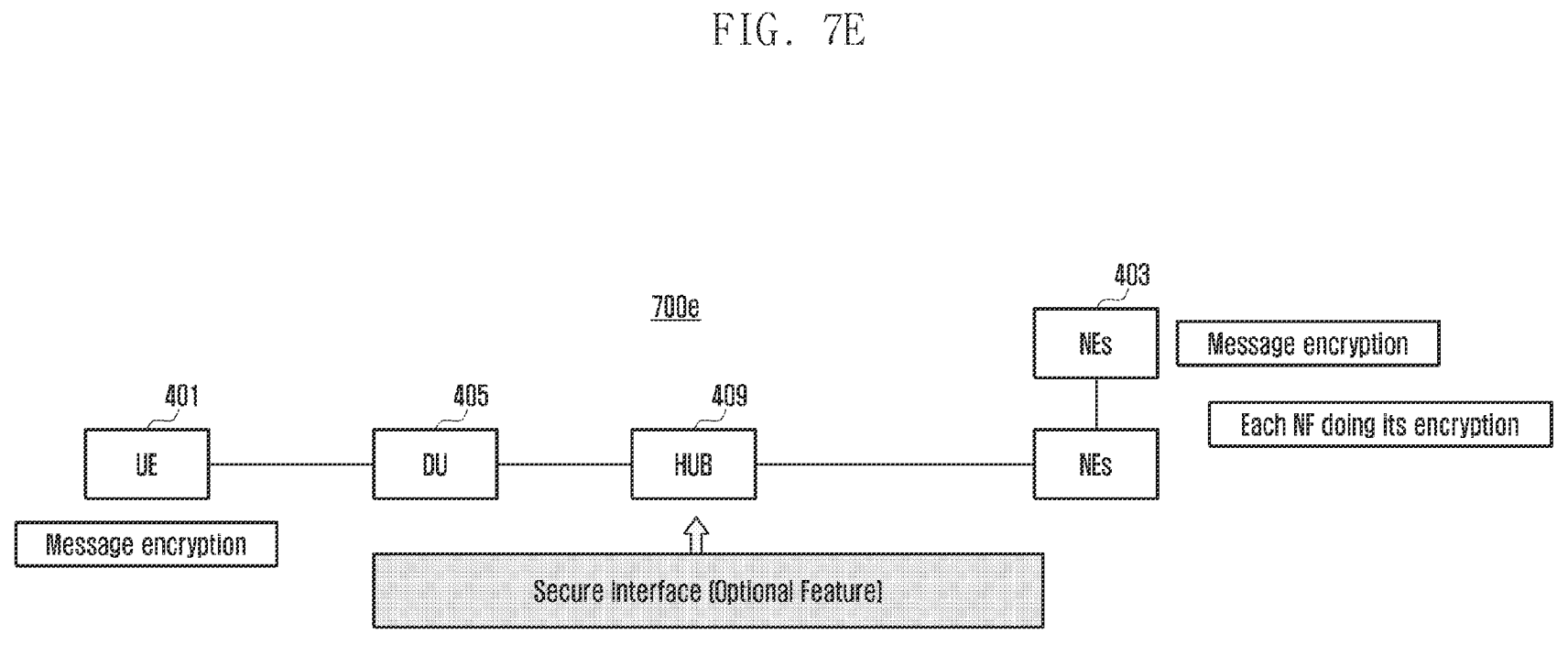

Message encryption

405 DU

409 HUB

Secure interface (Optional Feature)

403 NFs

NFs

Message encryption

Each NF doing its encryption

Figure 8:
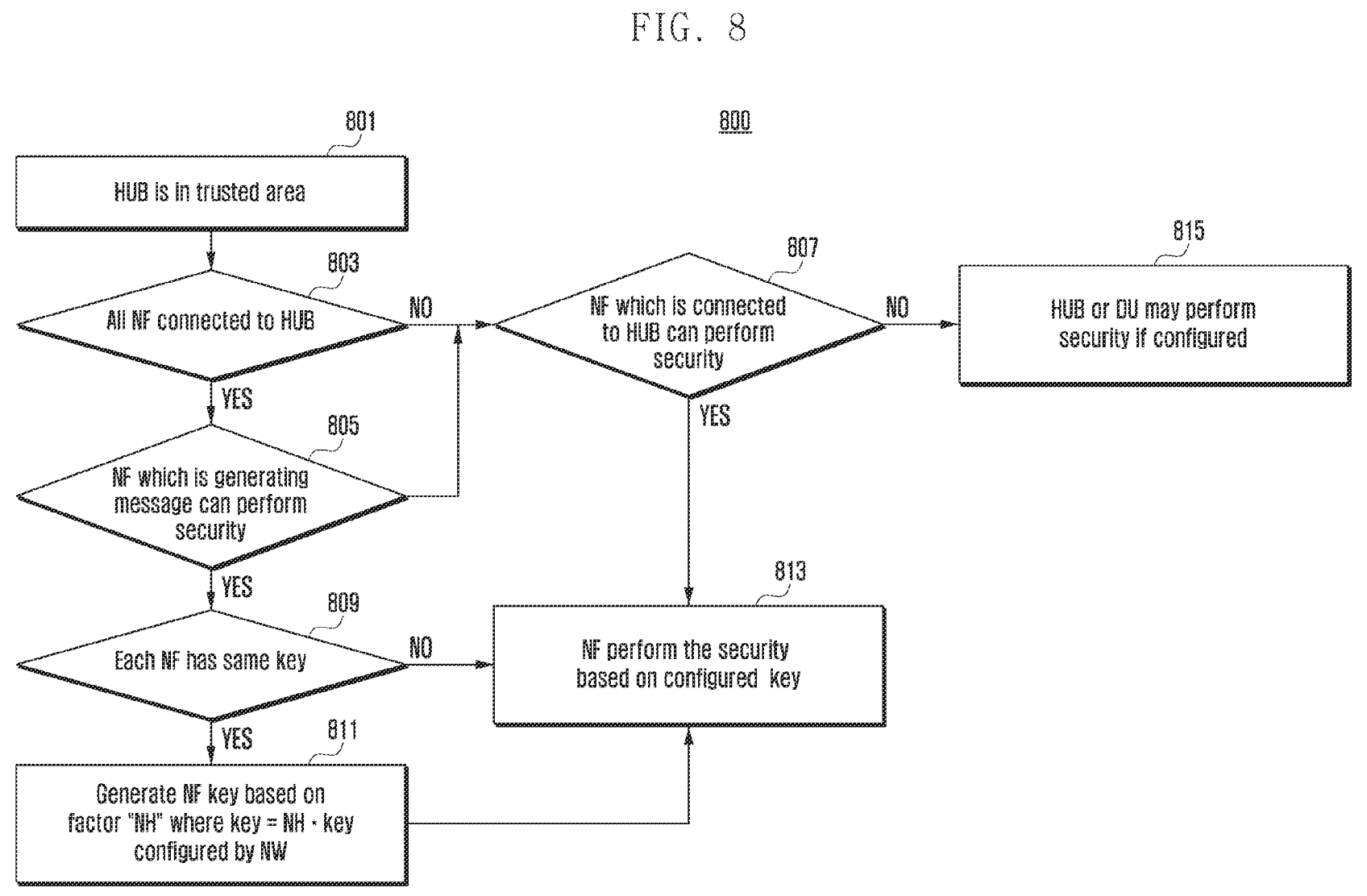

801 HUB is in trusted area

803 All NF connected to HUB

YES

NO

805 NF which is generating message can perform security

YES

NO

807 NF which is connected to HUB can perform security

YES

NO

809 Each NF has same key

YES

NO

811 Generate NF key based on factor "NH" where key = NH + key configured by NW

813 NF perform the security based on configured key

815 HUB or DU may perform security if configured 900
901
HUB is in non trusted area
903
All NF connected to HUB
YES
NO
905
NF which is generating message can perform security
YES
NO
907
NF which is connected to HUB can perform security
909
Each NF has same key
YES
NO
911
Generate NF key based on factor "NH" where key = NH • key configured by NW
913
NF perform the security based on configured key
915
HUB or DU may perform security FIG. 10
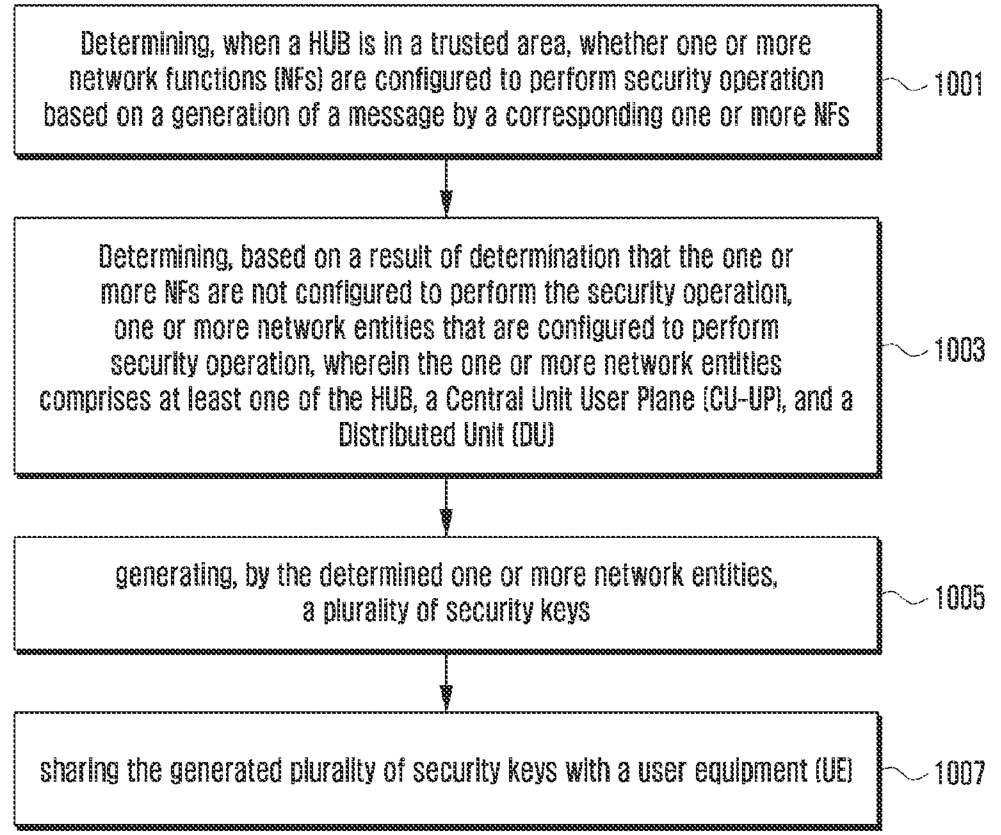

FIG. 14

FIG. 16
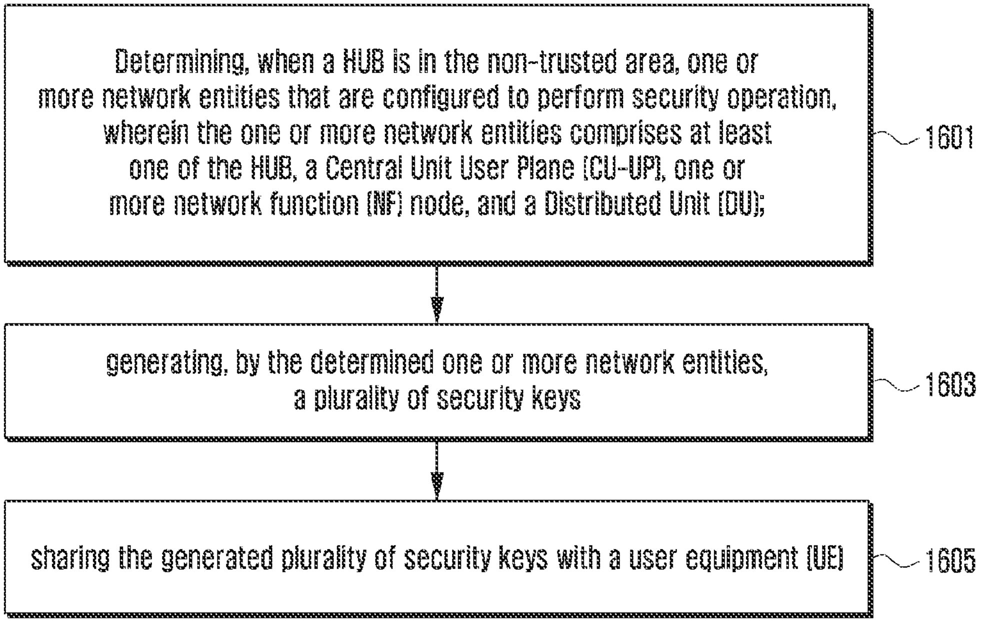

Figure 17:
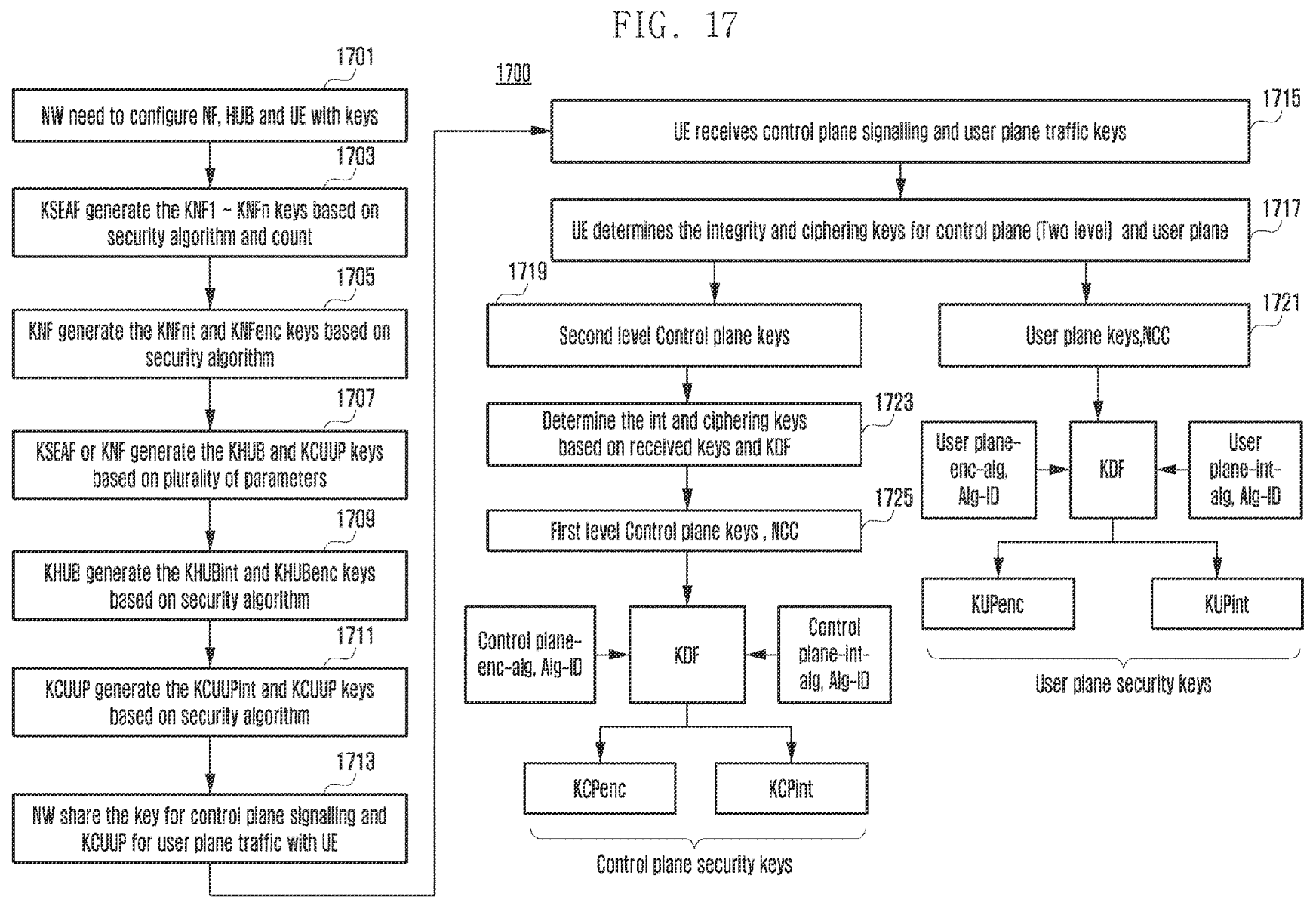

1701 NW need to configure NF, HUB and UE with keys

1703 KSEAF generate the KNF1 ~ KNFn keys based on security algorithm and count

1705 KNF generate the KNFnt and KNFenc keys based on security algorithm

1707 KSEAF or KNF generate the KHUB and KCUUP keys based on plurality of parameters 1709 KHUB generate the KHUBint and KHUBenc keys based on security algorithm 1711 KCUUP generate the KCUUPint and KCUUP keys based on security algorithm 1713 NW share the key for control plane signalling and KCUUP for user plane traffic with UE 1715 UE receives control plane signalling and user plane traffic keys 1717 UE determines the integrity and ciphering keys for control plane (Two level) and user plane 1719 Second level Control plane keys 1723 Determine the int and ciphering keys based on received keys and KDF 1725 First level Control plane keys , NCC Control plane-enc-alg, Alg-ID

KDF

Control plane-int-alg, Alg-ID

KCPenc

KCPint

Control plane security keys

1721 User plane keys,NCC

User plane-enc-alg, Alg-ID

KDF

User plane-int-alg, Alg-ID

KUPenc

KUPint

User plane security keys

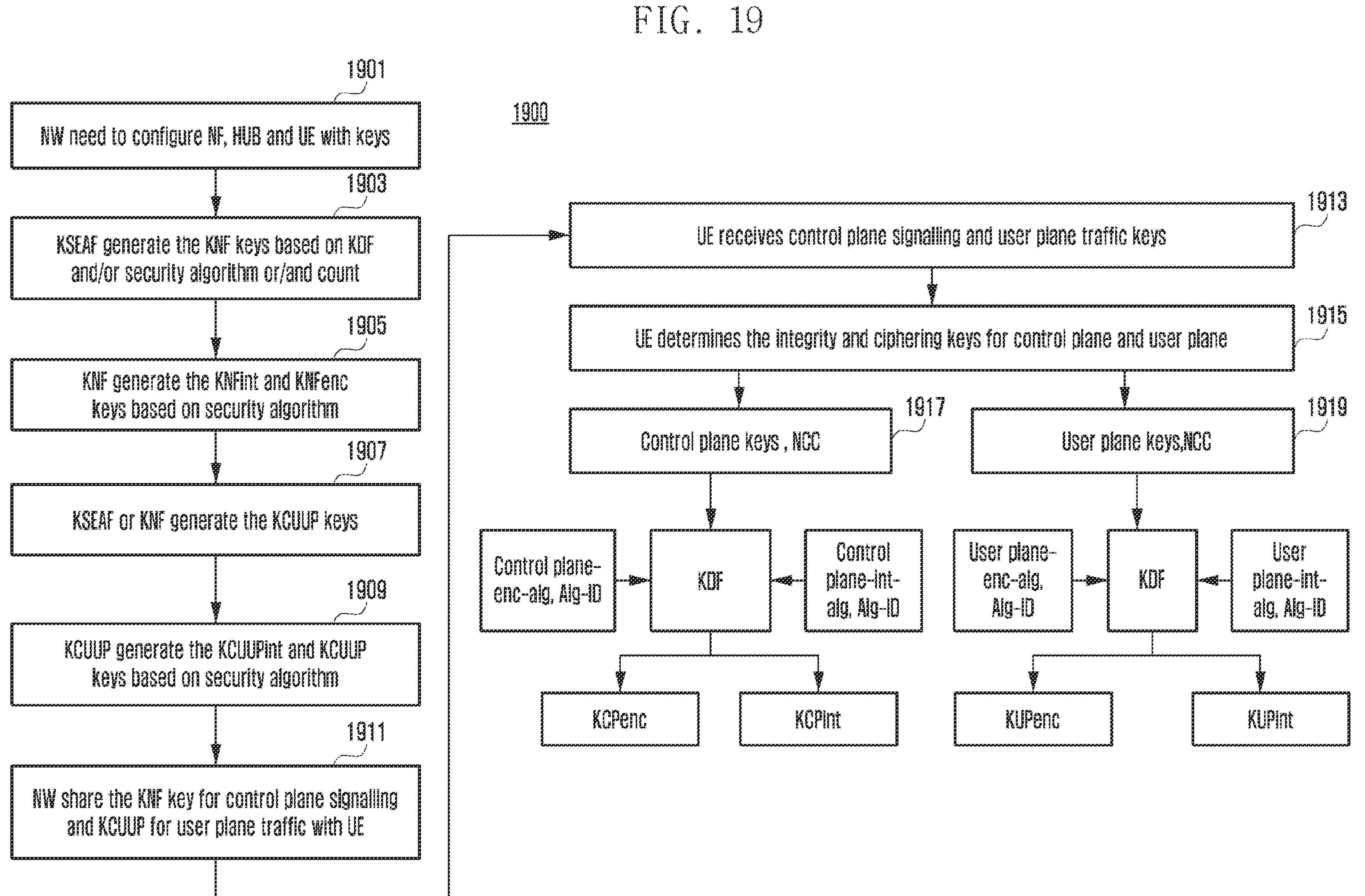
FIG. 19
1900
1901
NW need to configure NF, HUB and UE with keys
1903
KSEAF generate the KNF keys based on KDF and/or security algorithm or/and count
1905
KNF generate the KNFint and KNFenc keys based on security algorithm
1907
KSEAF or KNF generate the KCUUP keys
1909
KCUUP generate the KCUUPint and KCUUP keys based on security algorithm
1911
NW share the KNF key for control plane signalling and KCUUP for user plane traffic with UE
1913
UE receives control plane signalling and user plane traffic keys
1915
UE determines the integrity and ciphering keys for control plane and user plane
1917
Control plane keys , NCC
1919
User plane keys,NCC
Control plane-enc-alg, Alg-ID
KDF
Control plane-int-alg, Alg-ID
User plane-enc-alg, Alg-ID
KDF
User plane-int-alg, Alg-ID
KCPenc
KCPint
KUPenc
KUPint

Figure 21:
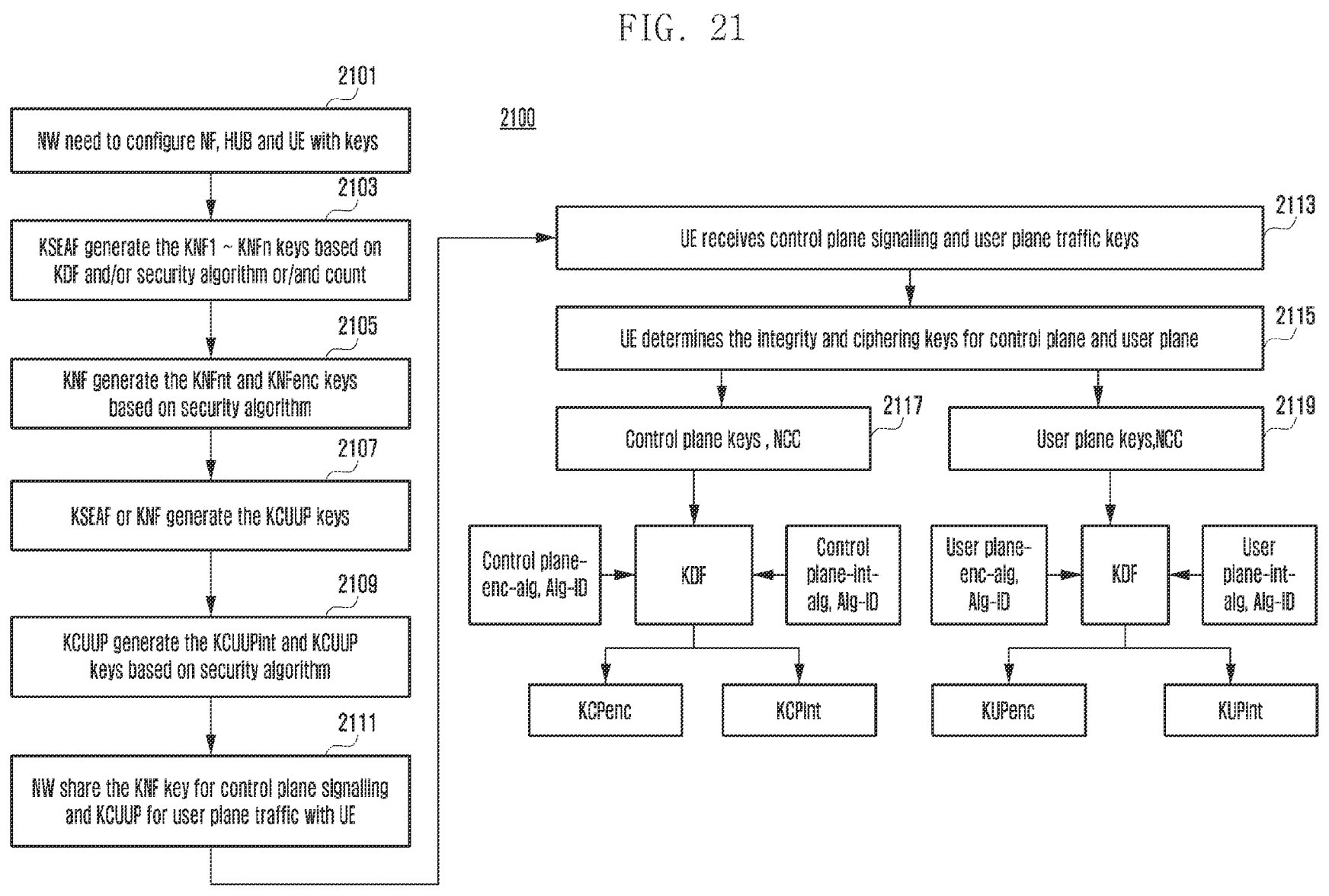

2101 NW need to configure NF, HUB and UE with keys

2103 KSEAF generate the KNF1 ~ KNFn keys based on KDF and/or security algorithm or/and count 2105 KNF generate the KNFint and KNFenc keys based on security algorithm 2107 KSEAF or KNF generate the KCUUP keys 2109 KCUUP generate the KCUUPint and KCUUP keys based on security algorithm 2111 NW share the KNF key for control plane signalling and KCUUP for user plane traffic with UE 2113 UE receives control plane signalling and user plane traffic keys 2115 UE determines the integrity and ciphering keys for control plane and user plane 2117 Control plane keys , NCC Control plane-enc-alg, Alg-ID

KDF

Control plane-int-alg, Alg-ID

KCPenc

KCPint

2119 User plane keys,NCC

User plane-enc-alg, Alg-ID

KDF

User plane-int-alg, Alg-ID

KUPenc

KUPint

Figure 22:
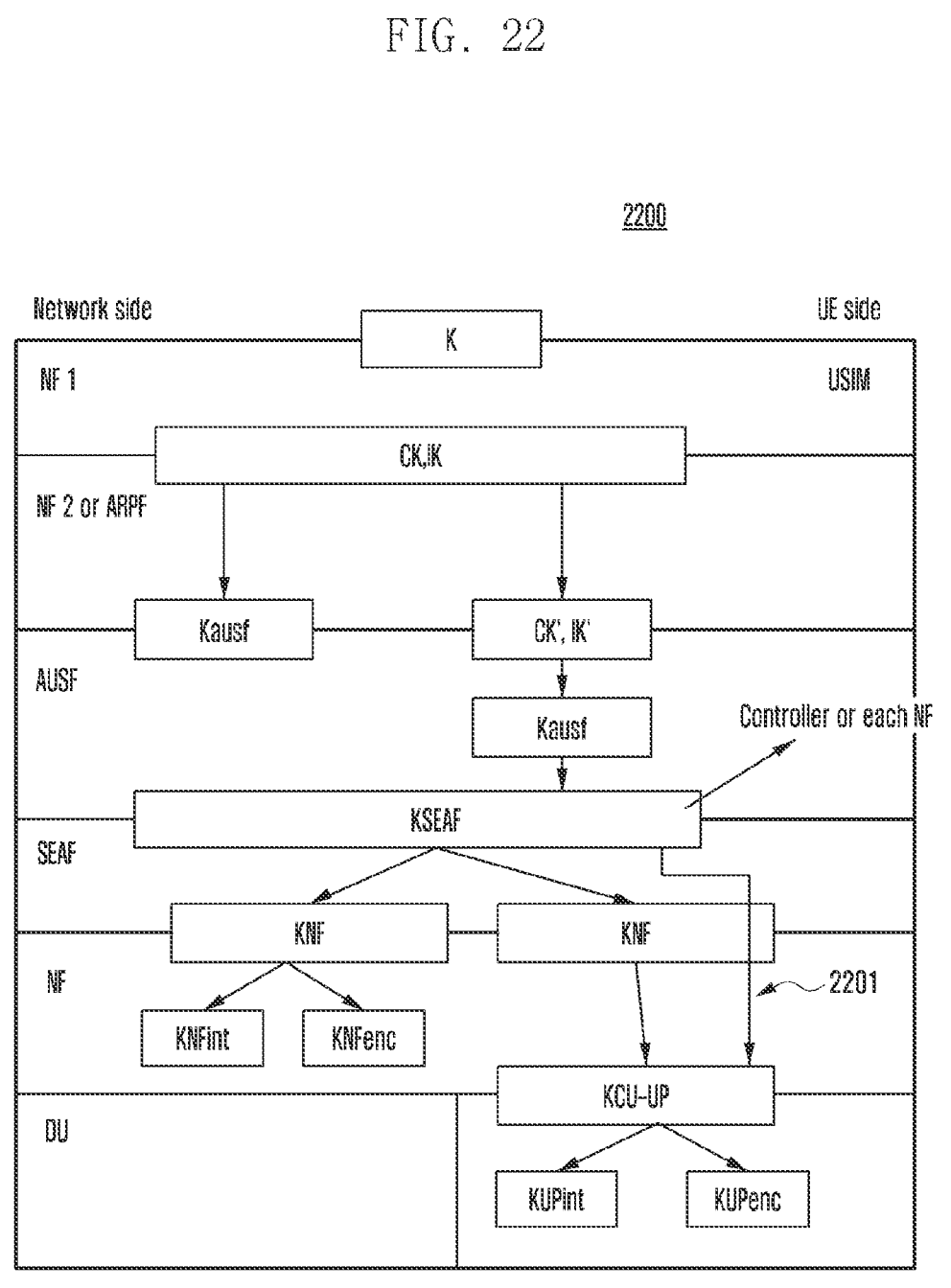

Network side
UE side
K
NF 1
USIM
CK,IK
NF 2 or ARPF
Kausf
CK', IK'
AUSF
Kausf
Controller or each NF
KSEAF
SEAF
KNF
KNF
NF
2201
KNFint
KNFenc
KCU-UP
DU
KUPint
KUPenc

METHOD AND SYSTEM FOR DESIGNING SECURITY PROTOCOL FOR 6G NETWORK ARCHITECTURE

CROSS-REFERENCE TO RELATED APPLICATIONS

This application is a continuation of International Application No. PCT/KR2023/006912 designating the United States, filed on May 22, 2023, in the Korean Intellectual Property Receiving Office and claiming priority to Indian Provisional Patent Application No. 202241029500, filed on May 23, 2022, and to Indian Non-Provisional Patent Application No. 202241029500 filed on May 10, 2023, in the Indian Patent Office, the disclosures of all of which are incorporated by reference herein in their entireties.

BACKGROUND

Field

The disclosure relates to the field of wireless communication. For example, the present disclosure relates to a design of security protocol for 6G network architecture.

Description of Related Art

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collison avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mecahnisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

In recent years, several broadband wireless technologies have been developed to meet the growing number of broadband subscribers for providing better applications and services to users. A Second generation (2G) wireless communication system has been developed to provide voice services while ensuring the mobility of users. Third-generation (3G) wireless communication system supports not only the voice services but also the data services. In recent years, a fourth generation (4G) wireless communication system has been developed to provide high-speed data service. However, currently, the 4G wireless communication system suffered a lack of resources to meet the growing demand for high-speed data services. This problem was addressed by the deployment of a fifth-generation (5G) wireless communication system to meet the ever-growing demand for high-speed data services. Furthermore, the 5G wireless communication system provides ultra-reliability and support to low-latency applications.

In general, the 5G system architecture is based on a Service-Based Architecture (SBA) as per TS 23.501 of the Third Generation Partnership Project (3GPP). Further, as per the TS 23.501 of the 3GPP, in the 5G system architecture, the interaction between network functions (NFs) can be represented in the following two ways.

1. A service-based representation, where the network functions (e.g. AMF) within the Control Plane (CP) may enable other authorized network functions to access their services. This representation also includes point-to-point reference points wherever necessary.
2. A reference point representation, where the interaction exists between the NF services in the network functions described by a point-to-point reference point (e.g. N11) between any two network functions (e.g. AMF and SMF).

FIG. 1 illustrates a 5G system architecture depicting the usage of service-based interfaces within the Control Plane (CP), in accordance with the existing prior art. The 5G service-based core network architecture brings more scalability and flexibility as any NF node can interact with any other NF node. The 5G System architecture leverage service-based interactions between the CP and the NFs. As shown in FIG. 1, a set of NFs provide services to other authorized NFs to access their services through a service-based interface (SBI). An NF service is referred to as a type of capability exposed by an NF which act as an NF service producer to another authorized NF acting as an NF service consumer through a service-based interface. The NF service may support one or more NF service operation(s). The NFs may offer different functionalities, and thus different NF services. Each of the NF services offered by the NF is self-contained, acts, and managed independently from other NF services offered by the same NF (e.g. for scaling, and healing).

The SBI represents how a set of services is provided or exposed by the NF. The SBI is the interface where the NF service operations are invoked. The CP interfaces within the 5G core network specified in the TS 23. 501 of 3GPP are defined as service-based interfaces. The CP interfaces that are defined in the 5G core network are for example: —Namf, Nsmf, Nudm, Nnrf, Nnssf, Nausf, Nnef, Nsmsf, Nudr, Npcf, N5g-eir, Nlmf. The 5G System architecture includes the following NFs.

Authentication Server Function (AUSF).
Access and Mobility Management Function (AMF).
Data Network (DN), e.g. operator services, Internet access or 3rd party services.
Unstructured Data Storage Function (UDSF).
Network Exposure Function (NEF).
Network Repository Function (NRF).
Network Slice Specific Authentication and Authorization Function (NSSAAF).
Network Slice Selection Function (NSSF).
Policy Control Function (PCF).
Session Management Function (SMF).
Unified Data Management (UDM).
Unified Data Repository (UDR).
User Plane Function (UPF).
UE radio Capability Management Function (UCMF).
Application Function (AF).
User Equipment (UE).
(Radio) Access Network ((R)AN).
5G-Equipment Identity Register (5G-EIR).
Network Data Analytics Function (NWDAF).
Charging Function (CHF)

Though the 5G core is based on the SBI, however, the RAN to a core network is still point-to-point interaction. FIG. 2 illustrates an example scenario in a case the core network is at the same location as the RAN, according to an existing state-of-the-art technique. Due to the virtualization of the network function, the RAN as well as the core network may be at the same location. However, the RAN can only interact with a single core network entity i.e. AMF as depicted in FIG. 2. The RAN, as well as the AMF, becomes an anchor for all UE control messages and each message has to pass through these network entities which is inefficient as it impacts overall control plane latency. The point-to-point communication further leads to an increase in hops as can be seen from path 201 shown in FIG. 2. The multiple hops lead to an increase in overhead at the network nodes and an increase in control procedure completion time due to the involvement of multiple nodes. The point-to-point communication may also lead to redundant functionalities in the RAN and the core network's control plane. Further, the use of complex protocols like NG Application Protocol (NGAP) to communicate between two nodes also adds to the overheads. Further, with respect to the security aspects in the 5G system, the security is at two levels for the control plane. Accordingly, one level is for NAS signaling (AMF) and another level is for AS signaling (RRC). The purpose of NAS security is to securely deliver NAS signaling messages between the UE and the AMF in the control plane using NAS security keys. Further, there is a possible case where gNB can be deployed separately as compared to other core NW nodes. Thus, there are higher chances that an attacker can fetch the message at gNB once the gNB receives the data and the received data is not encrypted at NAS. Therefore, the security of NAS is important in systems. Further, there is additional security at AS which is done at a PDCP layer. Therefore, both RRC and NAS message that is gradually generated is again ciphered at the PDCP layer at the RAN. In the 5G system, the UE can send messages only to the RRC protocol layer and the RRC protocol layer can only transfer the messages to AMF so that the security at these two network nodes is sufficient.

As per TS 33.501 of the 3GPP, the F1 interface connects the gNB-CU to the gNB-DU. The F1 interface includes F1-C for the control plane and F1-U for the user plane. In order to protect the traffic on the F1-U and F1-C interface, IPsec ESP and IKEv2 certificates-based authentication shall be supported with confidentiality, integrity, and replay protection. The same security protocol is used for E1 interface. For the SBI, the 3GPP recommends the use of Transport Layer Security (TLS) security protocol.

FIG. 3 illustrates a key hierarchy, key derivation, and distribution scheme in the current 5G system, in accordance with the existing prior art. As per TS 33.501 of 3GPP. The keys related to authentication include the following keys: K, CK/IK. In the case of EAP-AKA', the keys CK' and IK' are derived from CK and IK, respectively. The key hierarchy includes the following keys: KAUSF, KSEAF, KAMF, KNASint, KNASenc, KN3IWF, KgNB, KRRCint, KRRCenc, KUPint, and KUPenc.

Keys for AUSF in the home network is KAUSF. The KAUSF is a key derived by the UE and AUSF from CK' and IK' in the case of EAP-AKA'. CK' and IK' is received by the AUSF as a part of transformed AV from ARPF or by the UE and ARPF from the CK, IK in case of 5G AKA. Further, KAUSF is received by AUSF as a part of the 5G HE AV from ARPF.

KSEAF is an anchor key derived by UE and AUSF from KAUSF. KSEAF is provided by AUSF to the SEAF in the serving network. The key for AMF in the serving network is referred to as KAMF. The KAMF is a key derived by UE and SEAF from KSEAF. KAMF is further derived by the UE and source AMF when performing horizontal key derivation.

The Keys for NAS signaling are KNASint and KNASenc. The KNASint is a key derived by UE and AMF from the KAMF, which shall only be used for the protection of the NAS signaling with a particular integrity algorithm. The KNASenc is a key derived by UE and AMF from KAMF, which shall only be used for the protection of NAS signaling with a particular encryption algorithm.

Key for NG-RAN is KgNB. The KgNB is a key derived by the UE and the AMF from KAMF. The KgNB is further derived by the UE and the source gNB when performing the horizontal or vertical key derivation. The KgNB is used as KeNB between the UE and ng-eNB. Further, the keys for UP traffic are KUPenc and KUPint. The KUPenc is a key derived by the UE and the gNB from the KgNB, which shall be used for the protection of UP traffic with a particular encryption algorithm. Further, the KUPint is a key derived by the UE and the gNB from the KgNB, which shall be used for the protection of UP traffic between the UE and the gNB with a particular integrity algorithm.

Keys for RRC signaling are KRRCint and KRRCenc. The KRRCint is a key derived by the UE and the gNB from the KgNB, which shall be used for the protection of the RRC signaling with a particular integrity algorithm. The KRRCenc is a key derived by ME and the gNB from the KgNB, which shall be used for the protection of the RRC signaling with a particular encryption algorithm.

The aforesaid design issues in the 5G systems are being overcome by the 6G architecture. The 6G system architecture provides a greater degree of freedom for the network function placement. The network architecture for the 6G systems provides network node communicates with any other network node being at RAN or core network function in a more flexible way. The flexibility in the communication further enables a single anchor for the UE to exchange control signaling with the network.

However, as the flexibility of communication of the network nodes with any other network node is increased, the security protocols need to be redesigned. Thus, there lies a need for a solution for a design security protocol for the 6G architecture that can address each of the above discussed-problems.

SUMMARY

According to an example embodiment, the present disclosure describes a method and system to design security protocol for the 6G network architecture. The 6G network architecture comprises a Radio Access Network (RAN) acting as a service-based RAN. As the RAN is service-based, therefore any NF node in the 6G network architecture may interact with any other NF node.

According to an example embodiment, the disclosure further provides a method for key hierarchy, key derivation, and distribution for the 6G network architecture. The method further includes the security design at various NF nodes, a HUB, and communication protocols between the NF nodes and the HUB for generating the keys. The disclosure also provides a method for key generation at a network and the UE for the 6G network architecture.

BRIEF DESCRIPTION OF THE DRAWINGS

The above and other aspects, features and advantages of the certain embodiments of the present disclosure will be more apparent from the following detailed description, taken in conjunction with the accompanying drawings in which like characters represent like parts throughout the drawings, and in which:

FIG. 1 illustrates a 5G system architecture depicting the usage of service-based interfaces within the Control Plane (CP), in accordance with the existing prior art.

FIG. 7A is a diagram illustrating an example design of security when the Hub is in the trusted area in the 6G network architecture of FIG. 4, according to various embodiments;

FIG. 7B is a diagram illustrating an example design of security when the HUB is not in the trusted area and both NF and HUB may perform security operations, according to various embodiments;

FIG. 7C is a diagram illustrating an example design of security when the HUB is in a non-trusted area and only NF performs security operations, according to various embodiments;

FIG. 7E is a diagram illustrating an example design of security when the HUB is in the non-trusted area and the NF which is generating the message doing security operation, according to various embodiments;

FIG. 8 is a flowchart illustrating example options for security design in the 6G network architecture of FIG. 4 when HUB is in the trusted area, according to various embodiments;

FIG. 10 is a flowchart illustrating an example process for key generation at the network and sharing it with the UE in the 6G architecture of FIG. 4 when the HUB is in the trusted area, according to various embodiments;

FIG. 14 is a diagram illustrating an example process for key generation at the network and the UE in the 6G architecture of FIG. 4 when HUB is in the trusted area and the DU and the CU-UP perform the control and user plane security, according to various embodiments;

FIG. 16 is a flowchart illustrating an example process for key generation at the network and sharing it with the UE in the 6G architecture of FIG. 4 when the HUB is in the non-trusted area, according to various embodiments;

FIG. 17 is a diagram illustrating an example process for key generation at the network and the UE in the 6G architecture of FIG. 4 when HUB is in the non-trusted area and the one or more network functions (NF) node, Hub, and the CU-UP perform the control and user plane security, according to various embodiments;

FIG. 19 is a diagram illustrating an example process for key generation at the network and the UE in the 6G architecture of FIG. 4 when HUB is in the non-trusted area and the single network functions (NF) node, and the CU-UP perform the control and user plane security, according to various embodiments;

FIG. 21 is a diagram illustrating an example process for key generation at the network and the UE in the 6G architecture of FIG. 4 when HUB is in the non-trusted area and one or more network functions (NF) nodes, and the CU-UP perform the control and user plane security, according to various embodiments;

FIG. 22 is a diagram illustrating example key hierarchy generation in 6G architecture when HUB is not in a trusted area and both NF and CUUP has to perform control plane security and user plane security, according to various embodiments;

Figure 2:
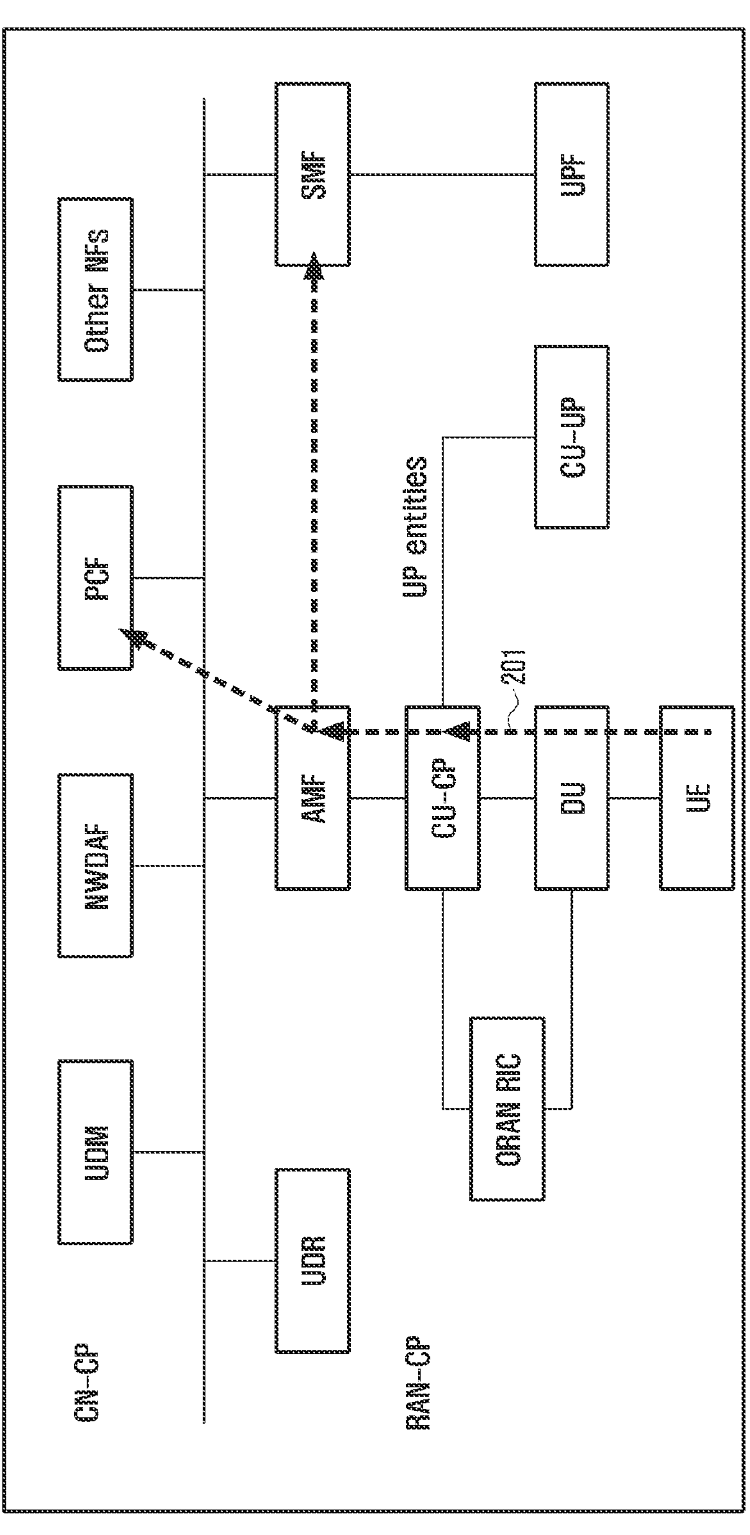
FIG. 2 illustrates an example scenario in a case the core network (CN) is at the same location as the RAN according to the state-of-the-art technique.
Figure 3:
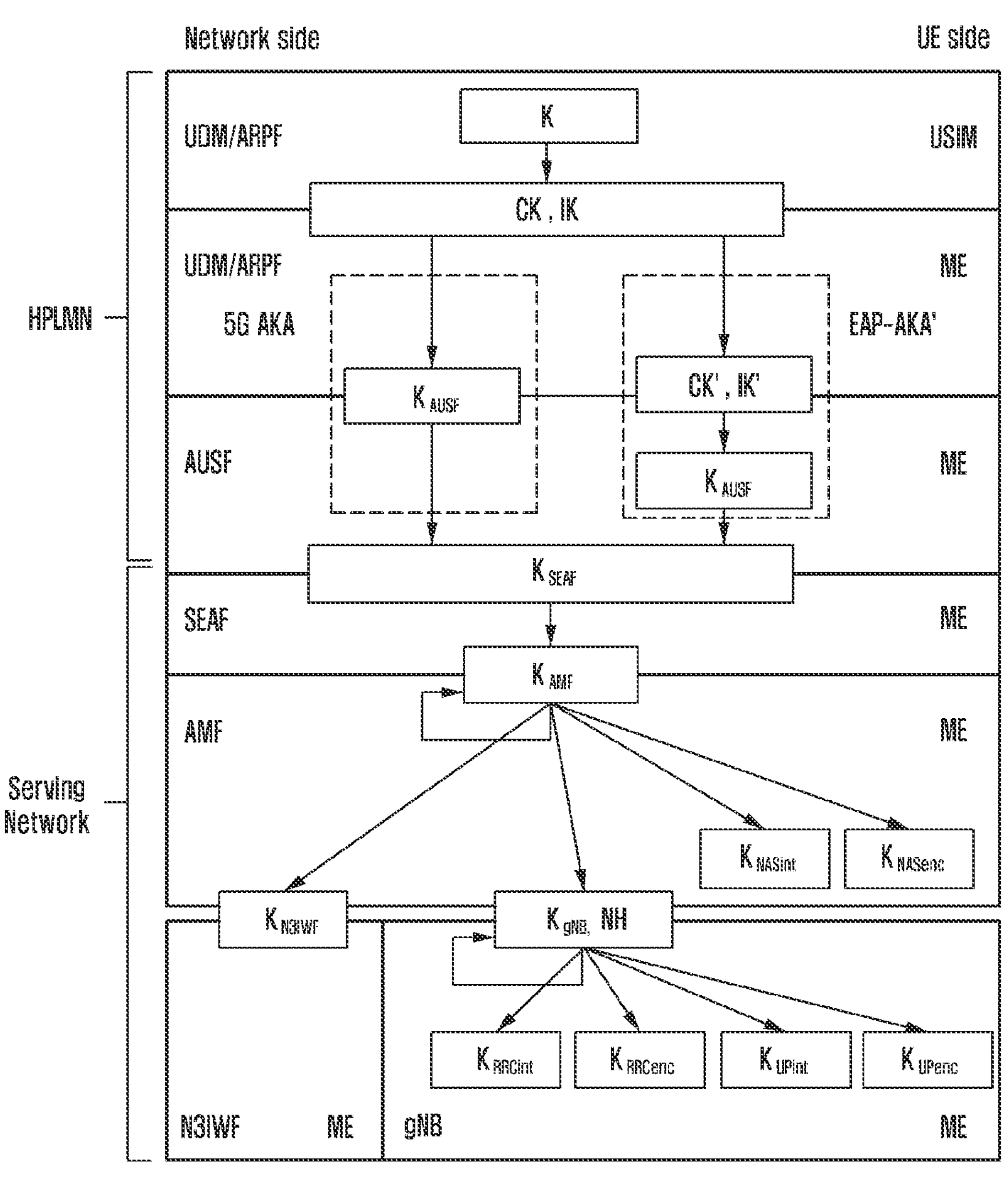
FIG. 3 illustrates a key hierarchy, key derivation, and distribution scheme in the current 5G system, in accordance with the existing prior art.

Further, skilled artisans will appreciate that elements in the drawings are illustrated for simplicity and may not have necessarily been drawn to scale. For example, the flowcharts illustrate the method. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having the benefit of the description herein.

DETAILED DESCRIPTION

It should be understood at the outset that although illustrative implementations of the various example embodiments of the present disclosure are illustrated below, the present disclosure may be implemented using any number of techniques, whether currently known or in existence. The present disclosure should in no way be limited to the illustrative implementations, drawings, and techniques illustrated below, including the example design and implementation illustrated and described herein, but may be modified within the scope of the disclosure.

The term "some" as used herein is defined as "one, or more than one, or all." Accordingly, the terms "one," "more than one," "more than one, but not all" or "all" would all fall under the definition of "some." The term "some embodiments" may refer to one embodiment or to several embodiments or to all embodiments. Accordingly, the term "some embodiments" is defined as meaning "one embodiment, or more than one embodiment, or all embodiments."

The terminology and structure employed herein are for describing, teaching, and illuminating various example embodiments and their specific features and elements and do not limit, restrict, or reduce the spirit and scope of the claims or their equivalents.

For example, any terms used herein such as but not limited to "includes," "comprises," "has," "have," and grammatical variants thereof do NOT specify an exact limitation or restriction and certainly do NOT exclude the possible addition of one or more features or elements, unless otherwise stated, and must NOT be taken to exclude the possible removal of one or more of the listed features and elements, unless otherwise stated with the limiting language "must comprise" or "needs to include."

Whether a certain feature or element was limited to being used only once, either way, it may still be referred to as "one or more features", "one or more elements", "at least one feature", or "at least one element." Furthermore, the use of the terms "one or more", and "at least one" feature or element does not preclude there being none of that feature or element unless otherwise specified by limiting language such as "there needs to be one or more . . . " or "one or more element is required."

Unless otherwise defined, all terms, and especially any technical and/or scientific terms, used herein may be taken to have the same meaning as commonly understood by one having ordinary skill in the art.

FIGS. 1 through 24, discussed below, and the various example embodiments used to describe the principles of the present disclosure are by way of illustration only and should not be construed in any way to limit the scope of the disclosure. Those skilled in the art will understand that the principles of the present disclosure may be implemented in any suitably arranged system or device.

Throughout the disclosure, the expression "at least one of a, b, or c" indicates only a, only b, only c, both a and b, both a and c, both b and c, all of a, b, and c, or variations thereof.

Herein, terms that identify access nodes, terms that refer to network entities or NFs, terms that refer to messages, terms that refer to interfaces between network entities, etc., are examples for convenience of explanation. Accordingly, the disclosure is not limited to the terms as herein used and may use different terms to refer to the items having the same meaning in a technological sense.

For the convenience of explanation, the disclosure may hereinafter use terms and definitions defined or described by the third generation partnership project (3GPP), long-term evolution (LTE),5G, and 6G standards. The disclosure is not, however, limited to the terms and definitions, and may equally apply to any systems that conform to other standards.

According to an embodiment, the present disclosure describes a method and system to design security protocol for the 6G network architecture. The 6G network architecture comprises a Radio Access Network (RAN) acting as a service-based RAN. As the RAN is service-based, therefore any NF node in the 6G network architecture may interact with any other NF node. The disclosure further provides a method for key hierarchy, key derivation, and distribution for the 6G network architecture. The method further includes the security design at various NF nodes, a HUB, and communication protocols between the NF nodes and the HUB for generating the keys. The disclosure also provides a method for key generation at a network and the UE for the 6G network architecture.

Figures 4A, 4B:
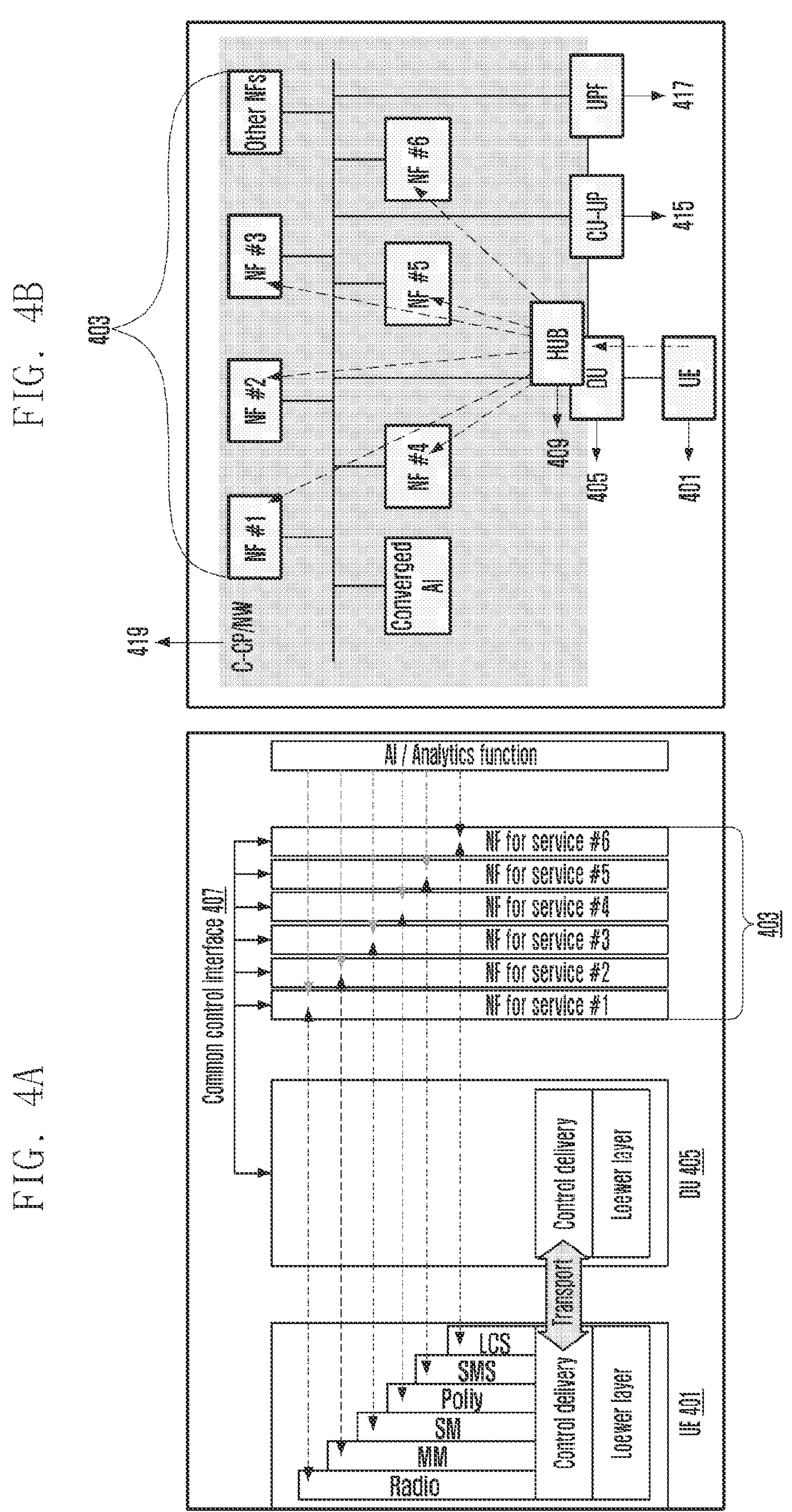
FIGS. 4A and 4B are diagrams illustrating illustrates a 6G network architecture. The 6G network architecture where RAN is acting as the service-based RAN according to various embodiments.

FIGS. 4A and 4B are diagrams illustrating an example 6G network architecture according to various embodiments. The 6G network architecture where RAN is acting as the service-based RAN. Referring FIG. 4A, a UE 401 communicates with one or more NFs 403 for various services through a distribution unit (DU) 405. As an example, all the NFs may be collectively referred to using reference numerals 403 for ease of explanation of various embodiments described herein throughout the disclosure. As an example, all the NFs may be alternatively referred to as NF node(s). In the 6G architecture, a RAN module and a Network (NW) or a control plane network function module (C-CP) 419 interact with each other through a common control interface 407. Referring FIG. 4B, the RAN module may include a User Equipment (UE) 401, a DU module 405, a HUB module 409, a switch, a CMD, a central unit user plane (CU-UP) 415, a user plane function (UPF) 417, a control plane network function module (C-CP) 419 etc. Further, the network (NW) or the C-CP 419 may include different network function (NF) modules 403. For example, the different NF modules may include, but are not limited to, $NF_1$, $NF_2$, $NF_3$, . . . $NF_n$, other NFs, converged AI, etc. As an example, each of the UE 401, DU module 405, HUB module 409, switch, CMD, CU-UP 415, and UPF 417 may be alternatively referred to as a network entity, interchangeably throughout the present disclosure. Further, the HUB module 409 and the DU module 405 may be alternatively referred to as a Hub and a DU respectively throughout the present disclosure.

The network entities that are included up to a layer corresponding to the Hub module, are the RAN modules, and beyond that, all the network entities are the control plane network function modules. As an example, the different NF modules may belong to different services like connection management, session management, handovers, service request, etc. Further, the terms "RAN module" and "RAN" have been used interchangeably throughout the description and drawings without any deviation from the scope of the present disclosure. Further, the control plane network function modules may be alternatively and interchangeably may referred to as the network throughout the present disclosure.

According to an embodiment, all the NF nodes 403 may be controlled by Hub 409 or the switch or the CMD which is a single anchor point for all the UE messages. The Hub 409 may be an independent module located at a specific NF 403 or along with DU 405, or may be kept at various NF 403. All control message transmissions between the UE 401 and Hub 409 may be managed through a single layer. The UE's control message is parsed at Hub 409, and then the Hub 409 delivers the UE's control message directly to a corresponding destination node. For example, in case the UE 401 wants to transmit a control message to the NF1 module of the Network 419. Then, in that case, the UE's control message is first parsed at the HUB module 409, and then further the HUB 409 module delivers the UE's 401 control message directly to the NF1 module. According to an embodiment, the HUB 409 and the rest of the NF nodes 403 are connected through an SBI. The SBI connectivity may use HTTP/2 types or equivalent protocols.

According to an embodiment, one of the possible implementations for the NFs could be where RAN and the AMF are combined together and a new module is created say NF1 or Control Management function (CMF). The new module CMF handles all the RRC messages as well as exiting NAS related functionalities. The CMF further handles connection establishment, registration procedure, handover, handling of radio link control and medium access control, and other basic NAS functionalities. Furthermore, an eSMF enhanced session management handles all session management and a bearer-related functionalities. Similarly, other NFs handle specific services related to various procedures. The HUB module 109 can directly interact with any Network function (as shown in FIG. 4B) which can decrease the overall network latency.

The creation of the new NF modules and functional re-composition or creation of new service-based modules may directly impact the design aspects like the design of signaling radio bearer, associated transmit& receive operation, and placement of various modules like PDCP, SDAP, RLC, MAC, PHY, etc.

In an embodiment, the 6G architecture as shown in FIGS. 4A and 4B is an end-to-end service-based architecture. The 6G architecture as shown in FIGS. 4A and 4B is highly efficient, flexible, and simple. However, there is a need to split the network function between the RAN and the Core Network (CN) for the 6G system which can provide a degree of freedom for the NFs placement. As the UE 401 interacts with any of the NFs 403 through Hub 409, there is a need to design security protocols to be followed between the NFs 403 and the UE 401. As each NFs 403 is generating messages, the generated messages by the NFs need to be protected with ciphering and integrity keys.

The disclosure captures key generation mechanisms as well as security protocol procedures between various network nodes and between UE and the network which can directly interact with the UE. According to an embodiment of the present disclosure, based on the placement of the Hub 409, a method for primary authentication and key agreement between the UE 401 and NW 419 is provided. Further, a method for the generation of Key hierarchy, Key derivation, and distribution scheme for various configurations that are based on a placement of the network entities like the Hub 409, UE 401, CU-UP 415, and the DU 405 is provided. Furthermore, a method for sharing generated keys by the network 419 to the UE 401 is provided. A more detailed explanation of each of the above methods will now be provided in the following paragraphs.

As defined in TS 33.501, the primary authentication and key agreement procedures are to enable mutual authentication between the UE and the network and provide keying material that can be used between the UE and the serving network in subsequent security procedures. The keying material generated by the primary authentication and key agreement procedure results in an anchor key called the KSEAF provided by the AUSF of the home network to the SEAF of the serving network. Due to the introduction of a new NW entity, e.g., the Hub in the 6G architecture, a new authentication procedure for EAP-AKA' is disclosed as new keys will be generated at the new NW entity. According to an embodiment, a new authentication procedure is defined between the HUB and the SEAF. Accordingly, the keys will be generated.

Figure 5:
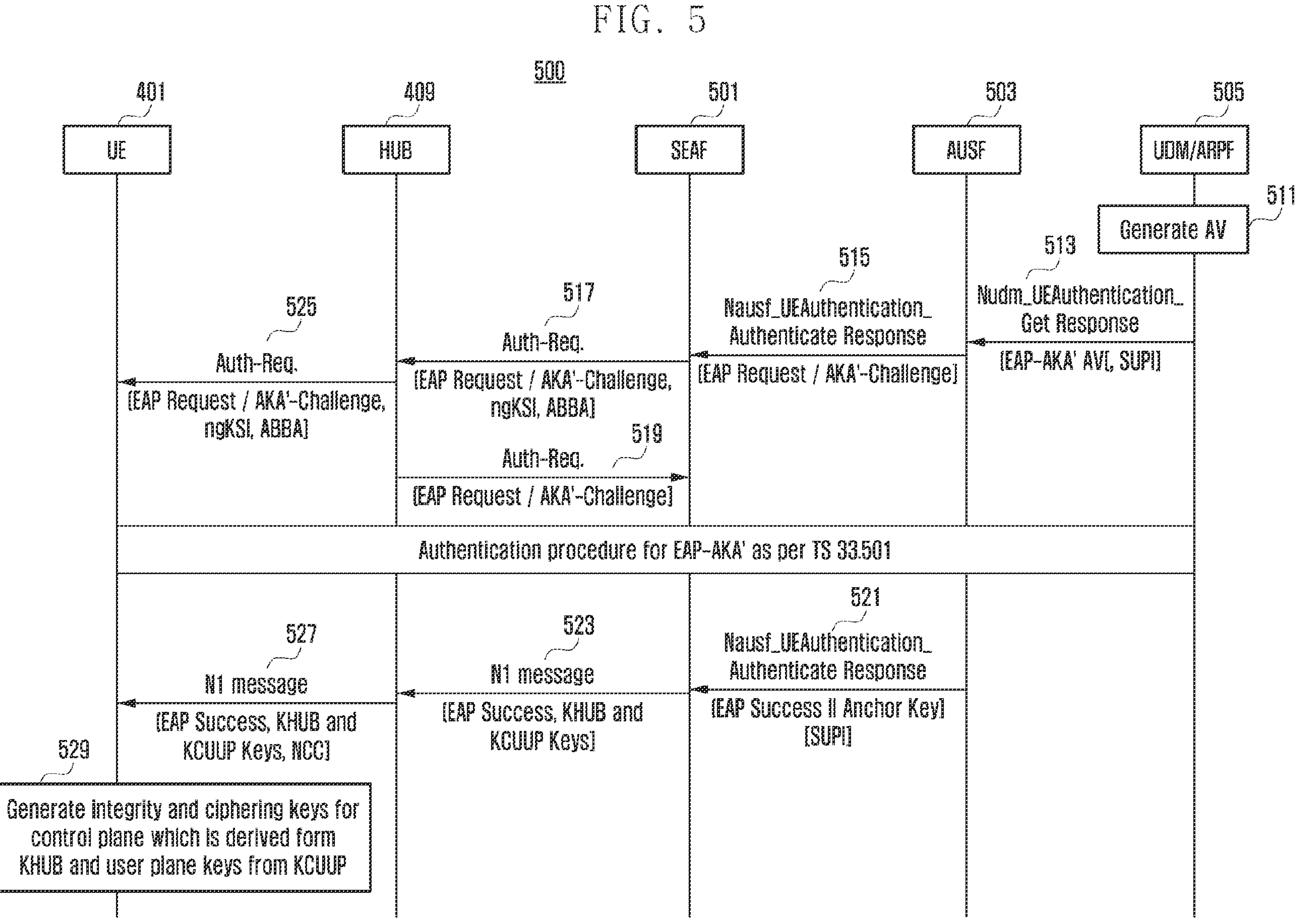
FIG. 5 is a signal flow diagram illustrating primary authentication and key agreement, according to various embodiments.

FIG. 5 is a signal flow diagram illustrating example flow for the primary authentication and key agreement, according to an embodiment of the present disclosure. According to an embodiment, the method 500 as shown in FIG. 5, discloses a new mechanism for the authentication procedure for EAP-AKA. As can be seen, the UE 401, operatively is in communication with the HUB 409, the SEAF 501, the AUSF 503, and the UDM/ARPF 505. As an example, the reference numerals for various components have been kept the same throughout the disclosure for ease of explanation. Referring back to FIG. 5, the UE 401 operatively communicates with the network for various services. The network may include Security Anchor Function (SEAF) 501, Authentication Server Function (AUSF) 503, Unified Data Manager (UDM)/Authentication Credential Repository & Processing Function (ARPF) 505. According to an embodiment, operations 517, 519, 523, 527, and 529 are newly illustrated. Further, the same has been included in TS 33. 501 specifications of 3GPP.

According to FIG. 5, at step 511, the UDM/ARPF 505 generates an AV, thereafter, at step 513 the UDM/ARPF 505 sends a Nudm_UEA Authentication_Get Response message to a AUSF 503. In particular the UDM/ARPF 505 shares a EAP-AKA' AV[SUPI] information to the AUSF 503. The AUSF 503 then sends a Nausf_UEAuthentication_Autheticate Response 515 to an SEAF 501. The Nausf_UEAuthentication_Autheticaate Response 515 includes EAP Request/AKA'-Challenge. The SEAF 501, then sends the Auth-Req. 517 to the HUB 409. The Auth-Req. 517 includes EAP Request/AKA'-Challenge, ngKSI, ABBA. In response, the HUB 409 sends Auth-Resp. 519 to SEAF 501. The Auth-Resp. 519 includes EAP Response/AKA'-Challenge. In the meantime, the AUSF 503 sends a Nausf_UEAuthentication-_Autheticaate Response 515 including EAP Success, Anchor Key, and SUPI to the SEAF 501. The SEAF 501 then sends N1 message 523 to the HUB 409. The N1 message include EAP Success, KHUB and KCUUP keys. Thereafter, the HUB 409 sends an Auth-Req. 525 to the UE 401. The Auth-Req. 525 includes EAP Request/AKA'-Challenge, ngKSI, ABBA. The HUB 409 further sends N1 message 527 to the UE 401. The N1 message includes EAP Success, KHUB and KUCCP keys and NCC. At step 529, the UE 401, based on the received KHUB and KUCCP key, generates integrity and ciphering keys for control planes which is derived from KHUB ad user plane keys from KCUUP.

According to an embodiment, the generation of Key hierarchy, key derivation, and distribution scheme depends upon which modules are performing security operations. Performing security operations may refer, for example, to the network node managing, taking care of, or addressing security aspects like security key generation, a distribution of the security keys, etc.

Figure 6:
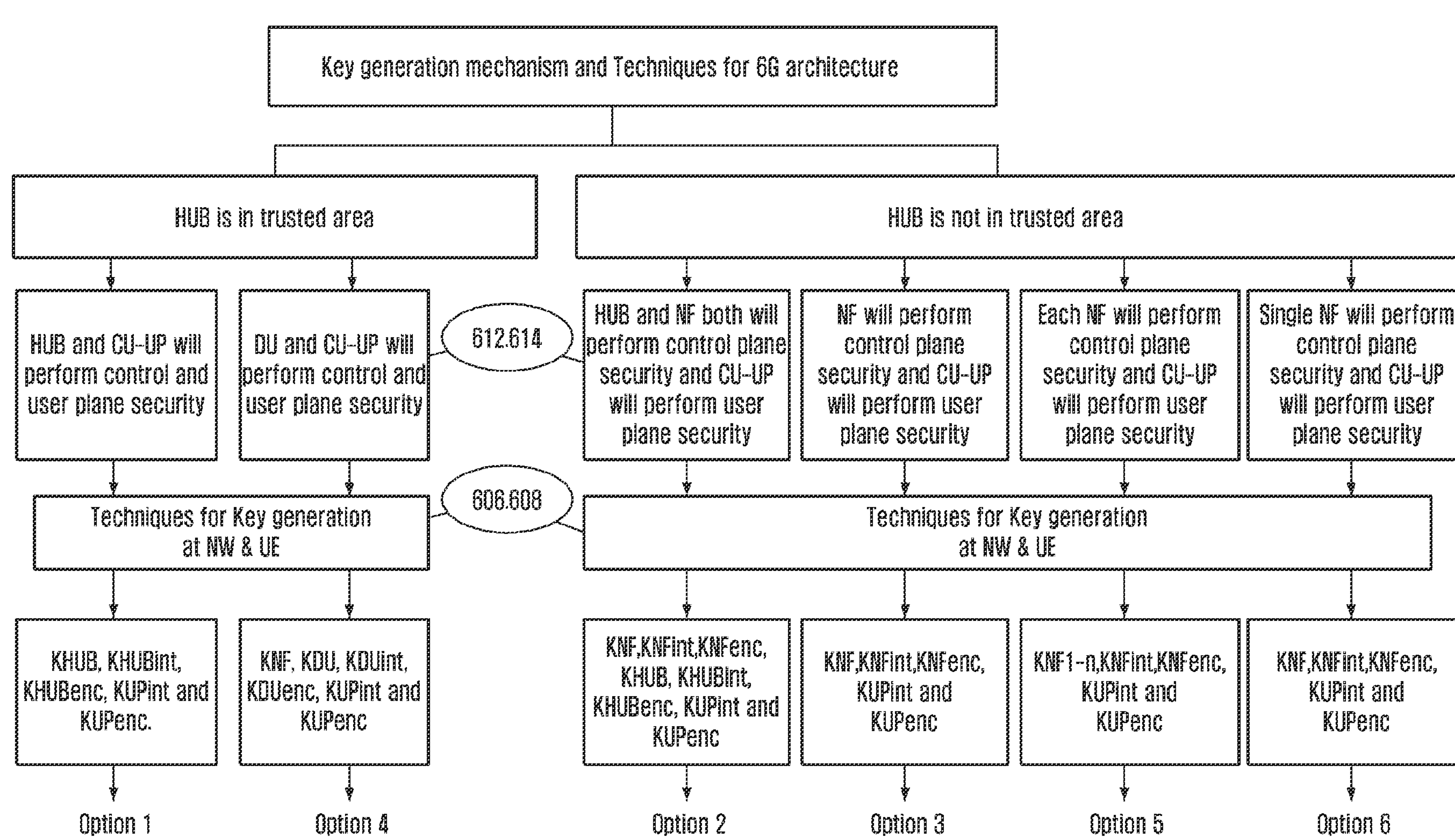
FIG. 6 is a diagram illustrating various alternatives where different network entities are performing security operations based on the placement of the Hub according to various embodiments.

FIG. 6 is a diagram illustrating various example alternatives where different network entities are performing security operations based on the placement of the Hub 409 according to various embodiments. According to an embodiment, the Hub 409 may be in a trusted area or in a non-trusted area. Based on the placement of the Hub 409, various network entities may perform security operations. Various example alternatives are also shown from option 1 to option 6 in FIG. 6. The various options are described below herein:

According to Option 1, when the Hub 409 is in the trusted area, the Hub 409 and CU-UP 415 may perform the control and user plane security. After applying the key generation techniques at the UE 401 and the NW 419, various integrity and ciphering keys may be generated. The generated integrity and ciphering keys may include KHUB, KHUBint, KHUBenc, KUPint, and KUPenc. A detailed explanation of each of the keys will be explained in detail in the forthcoming paragraphs.

According to Option 2, when the Hub 409 is in the trusted area, the DU 405 and CU-UP 415 may perform the control and user plane security. After applying the key generation techniques at the UE 401 and the NW 419, various integrity and ciphering keys may be generated. The generated integrity and ciphering keys may include KNF, KNFint, KDUint, KDUenc, KUPint, and KUPenc.

According to Option 3, when the Hub 409 is in the non-trusted area, the Hub 409 and NF 403 both perform the control plane security and CU-UP 415 performs user plane security. After applying key generation techniques at the UE 401 and the NW 419, various integrity and ciphering keys may be generated. The generated integrity and ciphering keys may include KNF, KNFint, KNFenc, KHUB, KHUBint, KHUBenc, KUPint, and KUPenc.

According to Option 4, when the Hub 409 is in the non-trusted area, the NF 403 may perform the control plane security and the CU-UP 415 may perform the user plane security. After applying key generation techniques at the UE 401 and the NW 419, various integrity and ciphering keys may be generated. The generated integrity and ciphering keys may include KNF, KNFint, KNFenc, KUPint, and KUPenc.

According to Option 5, when the Hub 409 is in the non-trusted area, each of the NFs 403 may perform the control plane security and the CU-UP 415 may perform the user plane security. After applying key generation techniques at the UE 401 and the NW 419, various integrity and ciphering keys may be generated. The generated integrity and ciphering keys may include $KNF_{1-n}$, KNFint, KNFenc, KUPint, and KUPenc.

According to Option 6, when the Hub 409 is in the non-trusted area, a single NF 403 may perform the control plane security and the CU-UP 415 may perform the user plane security. After applying key generation techniques at the UE 401 and the NW 419, various integrity and ciphering keys may be generated. The generated integrity and ciphering keys may include KNF, KNFint, KNFenc, KUPint, and KUPenc.

A detailed explanation of each of the keys will be explained in greater detail below.

FIG. 7A is a diagram 700*a* illustrating an example security design when the Hub 409 is in the trusted area in the 6G network architecture of FIG. 4, according to various embodiments. In an embodiment, the Hub 409 may be in the trusted area, such that there is no case where data received at the Hub 409 can be modified and any data received at the Hub 409 is completely secured. In this case, any NF 403 which is generating the message need not be ciphered or integrity protected. Once the Hub 409 receives the data, the Hub 409 may perform ciphering and integrity protection. The Hub 409 may add the TLS header (if needed) and may also cipher the data again if it is TLS ciphering. In this case, the NW 419 may provide the Hub 409 with ciphering keys, TLS, or Ipsec key. NF 403 may also have TLS or Ipsec key if the interface needs to be secured. The UE 401 on receiving the data may decipher the data and check the integrity of the data based on the received keys. In this case, the ciphering and integrity algorithms/technique may be executed at the HUB module 409.

Figure 7B:
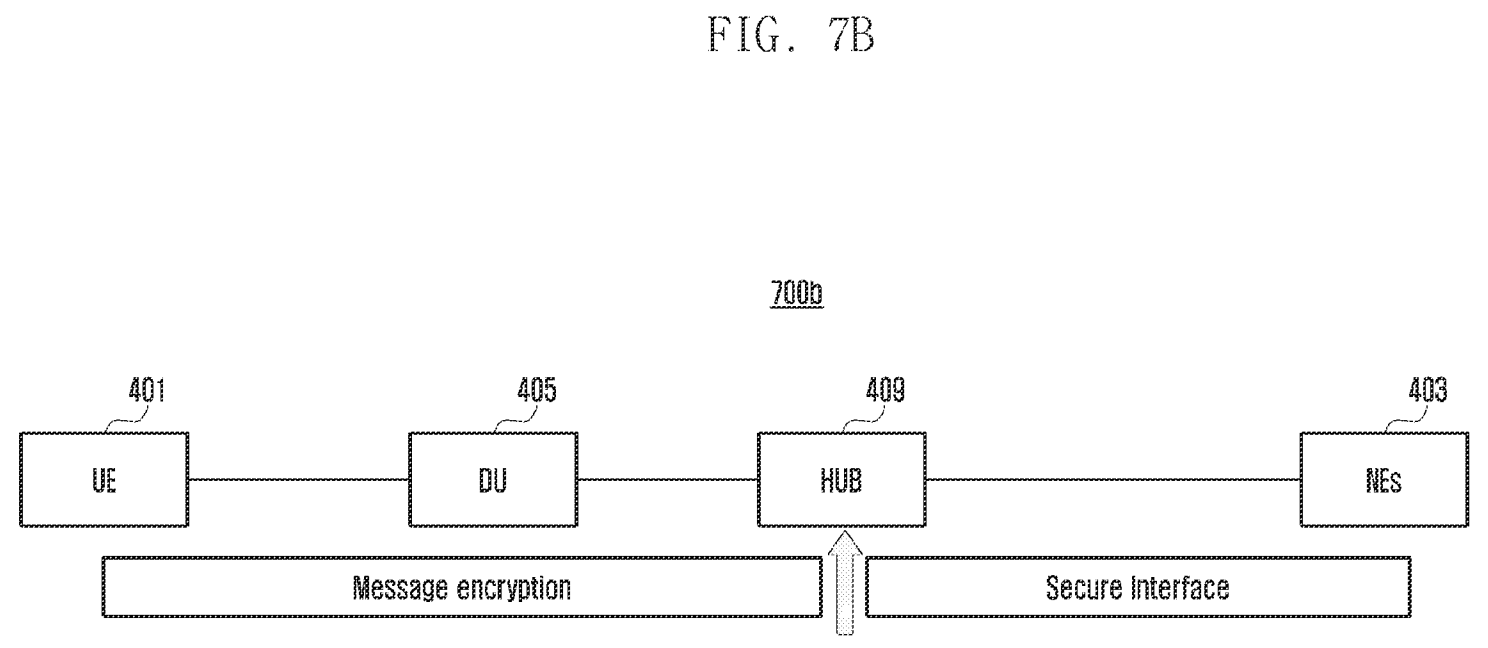

FIG. 7B is a diagram 700*b* illustrating an example design of security when the HUB is not in the trusted area and both NF and HUB may perform security operations, in accordance with an embodiment of the present subject matter. This is the case where data received at the Hub 409 may be modified and any data received at the Hub 409 is not completely secured. In this case, the NF 403 which is generating the message has to perform the ciphering and integrity. The ciphering and integrity keys may be common at all the NFs or may be separate for different NF which may be configured by the NW 403. The different keys generated at different NFs 403 may be based on a plurality of parameters. In a non-limiting example, the plurality of parameters may include a next hopping (NH) value that may have a different value for different NFs. Once the Hub 409 receives the data it again performs ciphering and integrity based on the keys as configured by the NW 419.

According to an example embodiment, different keys may be calculated based on equations 1-3.

$$NF1=NH1*\text{Keys} \quad (1)$$

$$NF2=NH2*\text{keys} \quad (2)$$

$$NFn=NHn*\text{keys} \quad (3)$$

Where, the value of the NH may be preconfigured at the NW entity or may be changed based on a decision of the NW (419).

Figure 7C:
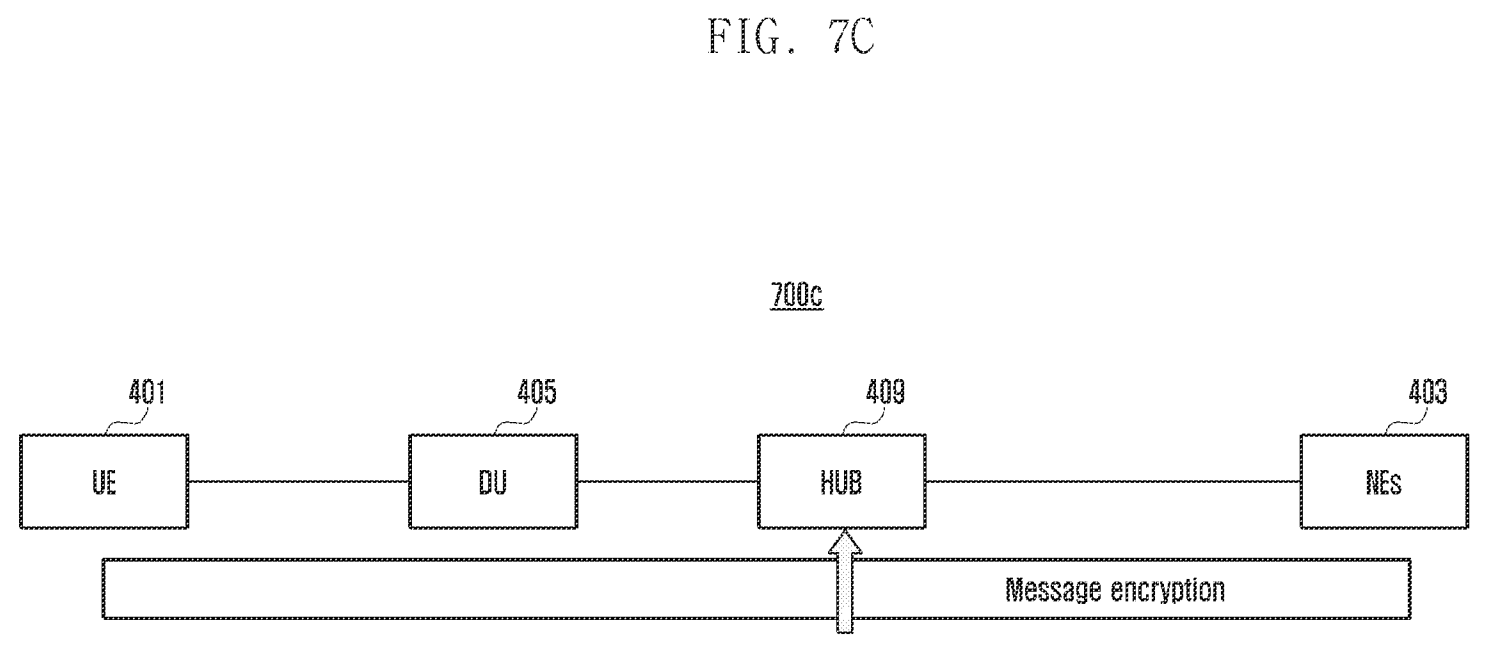

FIG. 7C is a diagram 700*c* illustrating an example design of security when the HUB is in the non-trusted area and NF as well the data unit (DU) performs security operations, according to various embodiments. In this case, the NF 403 which is generating the message has to perform ciphering and integrity. The ciphering and integrity keys may be common at all the NFs 403 or can be separate for different NFs 403 which may be configured by the NW 419. The different keys generated at different NFs 403 may be based on a plurality of parameters. In a non-limiting example, the plurality of parameters may include a next hopping (NH) value that may have a different value for different NFs. According to this embodiment, there will be no ciphering at the HUB module 409. In this case, the UE 401 will also be configured with multiple keys in case the NW 419 is configured with separate keys.

Figure 7D:
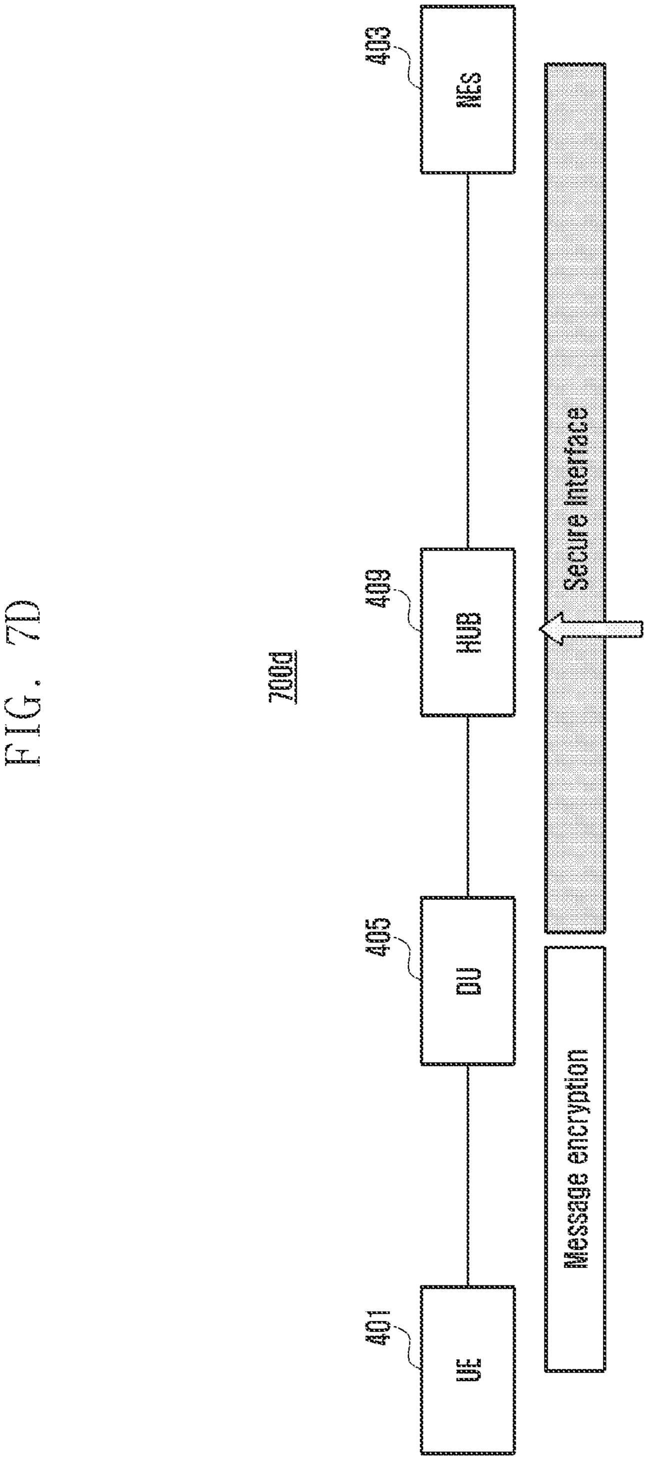
FIG. 7D is a diagram illustrating an example design of security when the HUB is in the trusted area and the data unit (DU) is performing security, according to various embodiments.

FIG. 7D is a diagram 700*d* illustrating an example design of security when the HUB is in the trusted area and the data unit (DU) is performing security, according to various embodiments. In this case, any NFs 403 which is generating the message need not be ciphered or integrity protected. Once the HUB 409 receives the data it will not perform ciphering and integrity protection. In this case, once the DU 405 receives the data then it will perform ciphering and integrity protection. The DU 405 needs to add the TLS header (if needed) and also cipher data again if the link needs to be secured with TLS ciphering. In this case, the NW 419 provides the DU 405 with the ciphering keys, TLS or Ipsec key. The NF 403 will have TLS or Ipsec key. The UE 401 on receiving the data deciphers the data and checks the integrity. In this case, the ciphering and integrity algorithm/technique is executed at the DU module 405.

FIG. 7E is a diagram 700*e* illustrating an example design of security when the HUB is in the non-trusted area and the NF which is generating the message doing security operation, according to various embodiments. In this case, the HUB 409 is connected to a single NF 403. In this case, the NFs 403 which is generating the message has to perform ciphering and integrity. The generation of keys and handling of keys will be applicable in this case also. The ciphering and integrity keys can be common at all the NFs or can be separate for different NF which can be configured by the NW. The different keys generated at different NFs 403 may be based on a plurality of parameters. In a non-limiting example, the plurality of parameters may include a next hopping (NH) value that may have a different value for different NFs. According to this embodiment, there is no ciphering at the HUB module 409. As the HUB may only communicate with the single NF 403 so only that NF 403 can send or receive the data.

Figure 7F:
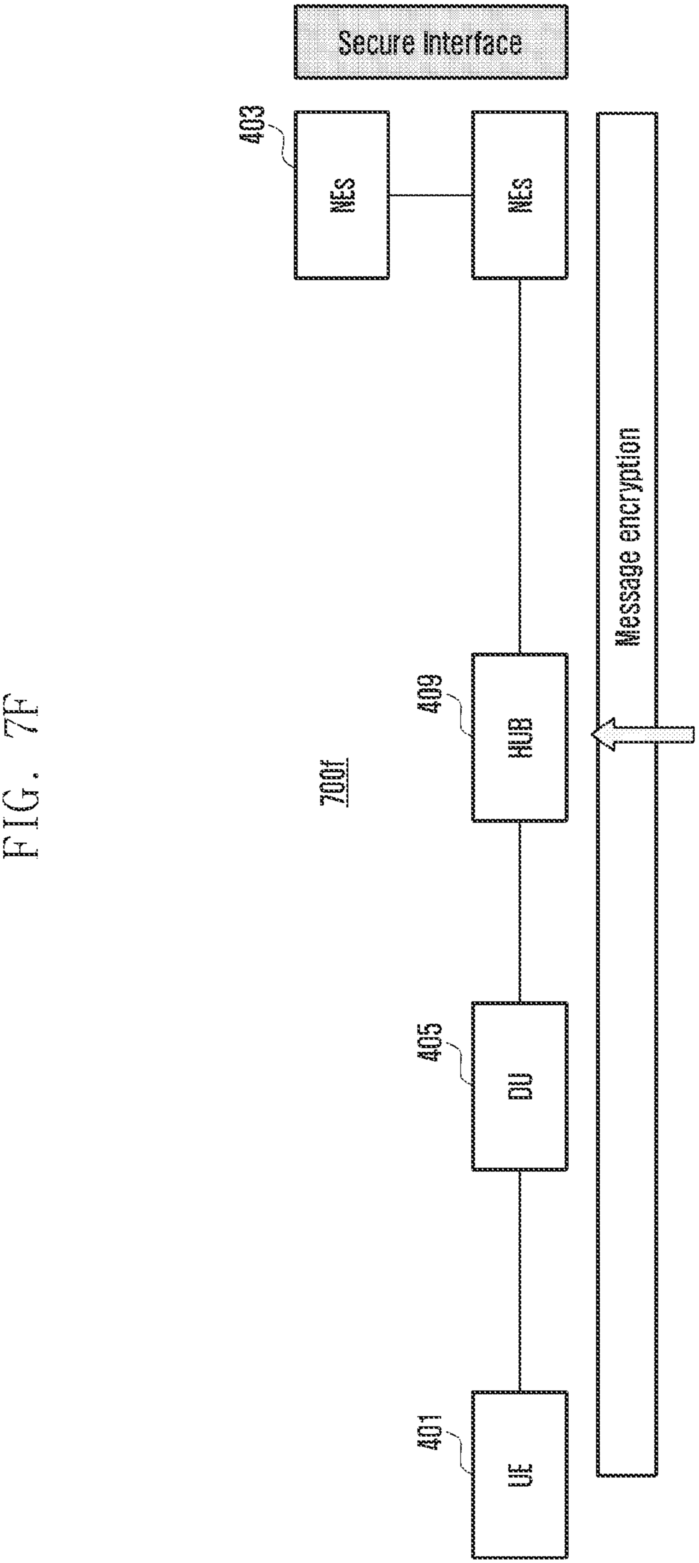
FIG. 7F is a diagram illustrating an example design of security when the HUB is in the non-trusted area and only single NF is doing security, according to various embodiments.

FIG. 7F is a diagram 700*f* illustrating an example design of security when the HUB is in the non-trusted area and only single NF is doing security, in accordance with an embodiment of the present subject matter. In this case, the Hub 409 is only connected to the single NF 403. In this case, only the NF 403 which is connected to the Hub 409 may only perform ciphering and integrity. Any message which is generated by any other NF 403 will send the data to this particular NF 403 which can communicate with the NF 403. There will be no ciphering at the Hub module 409. As the Hub may only communicate with the single NF, therefore only that NF 403 can send or receive the data.

FIG. 8 is a flowchart 800 illustrating example options for security design in the 6G network architecture of FIG. 4 when HUB is in the trusted area, according to various embodiments. According to an embodiment, the method 800 may be implemented in the 6G network architecture of FIG. 4.

According to an embodiment, method 800 is performed when the Hub 409 is in the trusted area as shown the block 801. Accordingly, when the Hub 409 is in the trusted area, at step 803, the network 419 determines whether all the NFs 403 are connected to the HUB 409. This may refer, for example, to the HUB 409 sending and receiving the data to any NFs 403. When all the NFs are connected to the HUB, method 800 proceeds to step 805. If at step 803 it was determined that all the NFs 403 are not connected to the HUB 409, the process proceeds to step 807.

Referring back, now after determining that all the NFs 403 are connected to the Hub 409 at step 805, the NW 419 determines whether the NF which is generating the message can perform security before it shares the data further. The NF that is generating the message may be considered as a final NF. According to various embodiments, the NF that is generating the message and also connected with the Hub 409 may be considered as a final NF where multiple NFs, though such NFs are involved in generating the final message.

Now when at step 805, it is determined that the NF 403 which is generating the message can perform security, then at step 809, it is determined whether each NF 403 includes the same key or not. According to various embodiments, different keys may be configured by the network 419 or it depends upon an operator whether it would like to have different keys. If each NF 403 includes the same key, then the process 800 proceeds toward step 811. Alternatively, if each NFs 403 does not include the same key, then the process 800 proceeds toward step 813.

When at step 805, it is determined that the NF 403 which is generating the message cannot perform security, the process 800 performs the operation at block 807.

Accordingly, if each NF 403 includes the same key, then at step 811, an NF key based on factor "NH" where key=NH*key configured by the NW 419 is generated.

If each NFs 403 does not include the same key, then at step 813, the NF 403 performs the security based on the configured key configured by the NW 419.

Referring back to step 803 and when all NFs 403 are not connected to the Hub 409, at step 807, it is determined whether the NF 403 that is connected to the HUB 409 can perform security operation. If the NF 403 that is connected to the HUB 409 can perform the security operations, then the process backtracks to step 813. If the NF 403 that is connected to the HUB cannot perform the security operation, then process 800 proceeds toward step 815. Accordingly, at step 815, the HUB 409 or DU 405 may perform security if configured.

Figure 9:
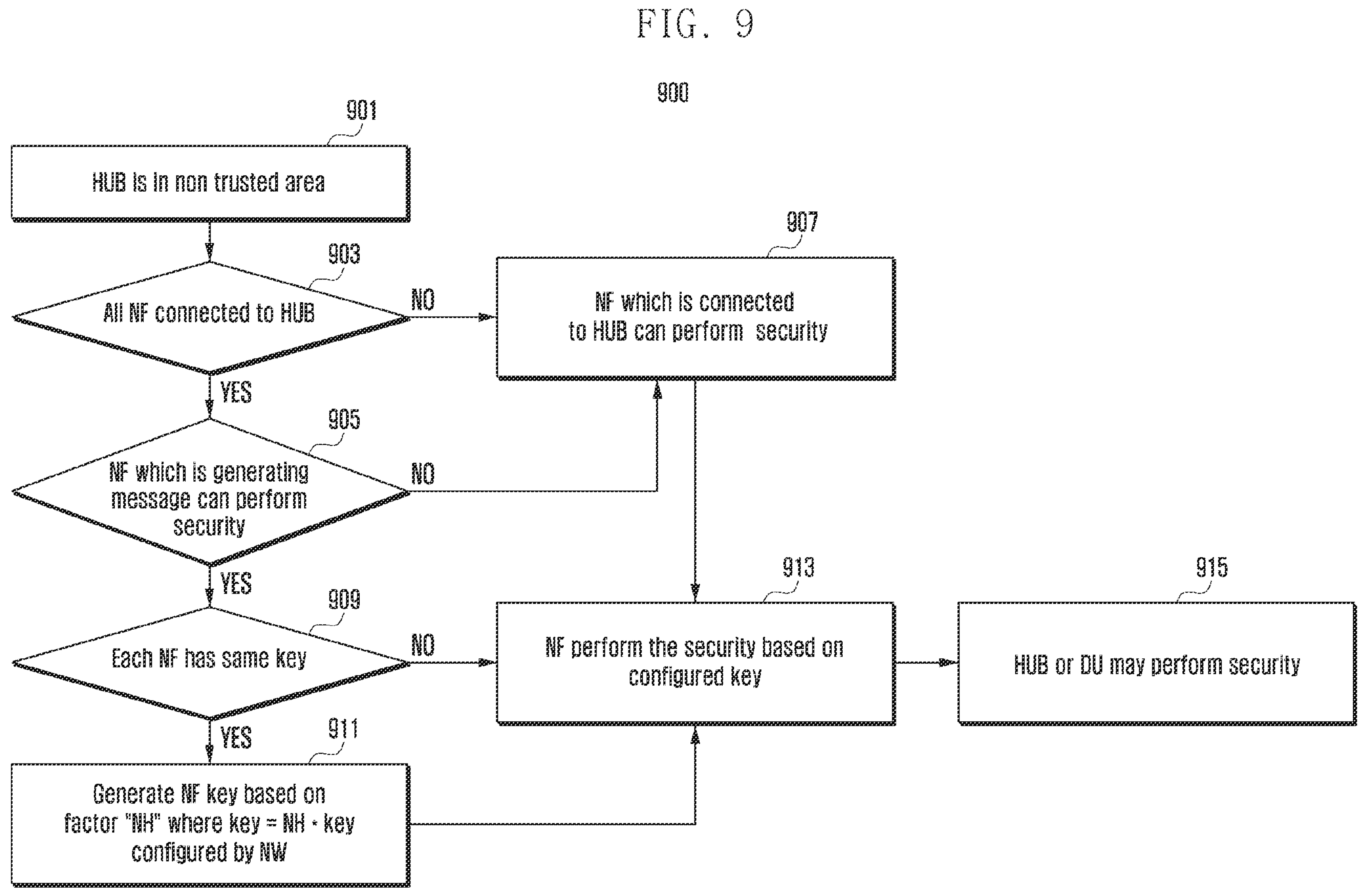
FIG. 9 is a flowchart illustrating example options for security design in the 6G network architecture of FIG. 4 when the HUB is in the non-trusted area, according to various embodiments.

FIG. 9 is a flowchart 900 illustrating example options for security design in the 6G network architecture of FIG. 4 when the HUB is in the non-trusted area, according to various embodiments. According to an embodiment, the method 900 may be implemented in the 6G network architecture of FIG. 4.

According to an embodiment, method 900 is performed when the Hub 409 is in the non-trusted area as shown the block 901. Accordingly, when the Hub 409 is in the non-trusted area, at step 903, the network 419 determines whether all the NF 403 are connected to the HUB 409 or not. This may refer, for example, to the HUB sending and receiving the data to any NF 403. Now, when it is determined that all the NFs 403 are connected to the HUB 409, then process 900 proceeds to step 905. If it is determined that all the NFs 403 are not connected to the HUB 409, then process 900 proceeds to step 907.

Accordingly, at step 905, the NW 419 is configured to determine whether the NF 403 which is generating the message can perform security before it shares the data further. The NF that is generating the message may be considered as a final NF. According to various embodiments, the NF that is generating the message and also connected with the Hub 409 may be considered as a final NF where multiple NFs, though such NFs are involved in generating the final message.

Now, at step 905, when it is determined that the NF 403 which is generating the message can perform security, then at step 909, it is determined whether each NF includes the same key or not. According to various embodiments, different keys may be configured by the network 419 or it depends upon an operator whether it would like to have different keys or not. If each NF 403 includes the same key, then the process 900 proceeds toward step 911. Alternatively, if each NFs 403 does not include the same key, then the process 900 proceeds toward step 913.

Now, at step 905, when it is determined that the NF 403 which is generating the message cannot perform security, then the process 900 performs the operation at block 907.

Accordingly, if each NF 403 includes the same key, then at step 911, an NF key based on factor "NH" where key=NH*key configured by the NW 419 is generated.

If each NFs 403 does not include the same key, then at step 913, the NF 403 performs the security based on the configured key configured by the NW 419.

Referring back to the step 903 and when all NFs 403 are not connected to the Hub 409, at step 907, the NF 403 that is connected to HUB can perform security, and the process backtracks to step 913. Accordingly, at step 915, the HUB or the DU may perform security operations if configured. The forthcoming paragraphs will now explain the Key generation mechanism and algorithm/techniques in detail for 6G architecture for various alternatives as shown in FIG. 6.

FIG. 10 is a flowchart illustrating an example process for key generation at the network and sharing it with the UE in the 6G architecture of FIG. 4 when the HUB is in the trusted area, according to various embodiments. According to an embodiment, method 1000 is implemented in the 6G architecture of FIG. 4. Further, method 1000 may be performed by the network entities included in the network. In a non-limiting example, the network entities included are the Hub 409, the DU 405, the CU-UP 415, or any control entity. According to an embodiment, each of the network entities may include one or more processor(s) configured to perform method 1000. Thus, the operations of each of the network entities and its corresponding processor(s) are the same and may be referred to interchangeably throughout the disclosure. The general diagram of the network entities and network function is in greater detail below with reference to FIG. 23.

According to an embodiment, in operation 1001, when a HUB is in a trusted area, the processor 2702 is configured to determine whether one or more network functions (NFs) 403 are configured to perform the security operation. The determination is based on a generation of the message by the corresponding one or more NFs. If it is determined that the one or more NFs 403 are not configured to perform the security operation, method 1001 proceeds to perform operation 1003. At operation 1003, the processor 2702 is configured to determine the one or more network entities that are configured to perform the security operation. In particular, at operation 1003 it is determined which network entity will perform the security operation. According to an embodiment, the one or more network entities include at least one of the HUB 409, a Central Unit User Plane (CU-UP) 415, and a Distributed Unit (DU) 405. The operation 1003 corresponds to the step 805 of FIG. 8. Thereafter, at operation 1005, the determined network entity e.g., the HUB 409, a Central Unit User Plane (CU-UP) 415, is configured to generate a plurality of security keys. According to an embodiment, the generated security keys are the integrity and ciphering keys of the respective network entities that perform the security operations for their respective control plane signaling and user plane signaling. After the generation of the security keys, the processor 2702, at operation 1007, is configured to share the generated plurality of security keys with the UE 401. The UE then derives the control plane keys and the user plane keys through a key derivation function (KDF) based on the received integrity and ciphering keys.

Figure 11:
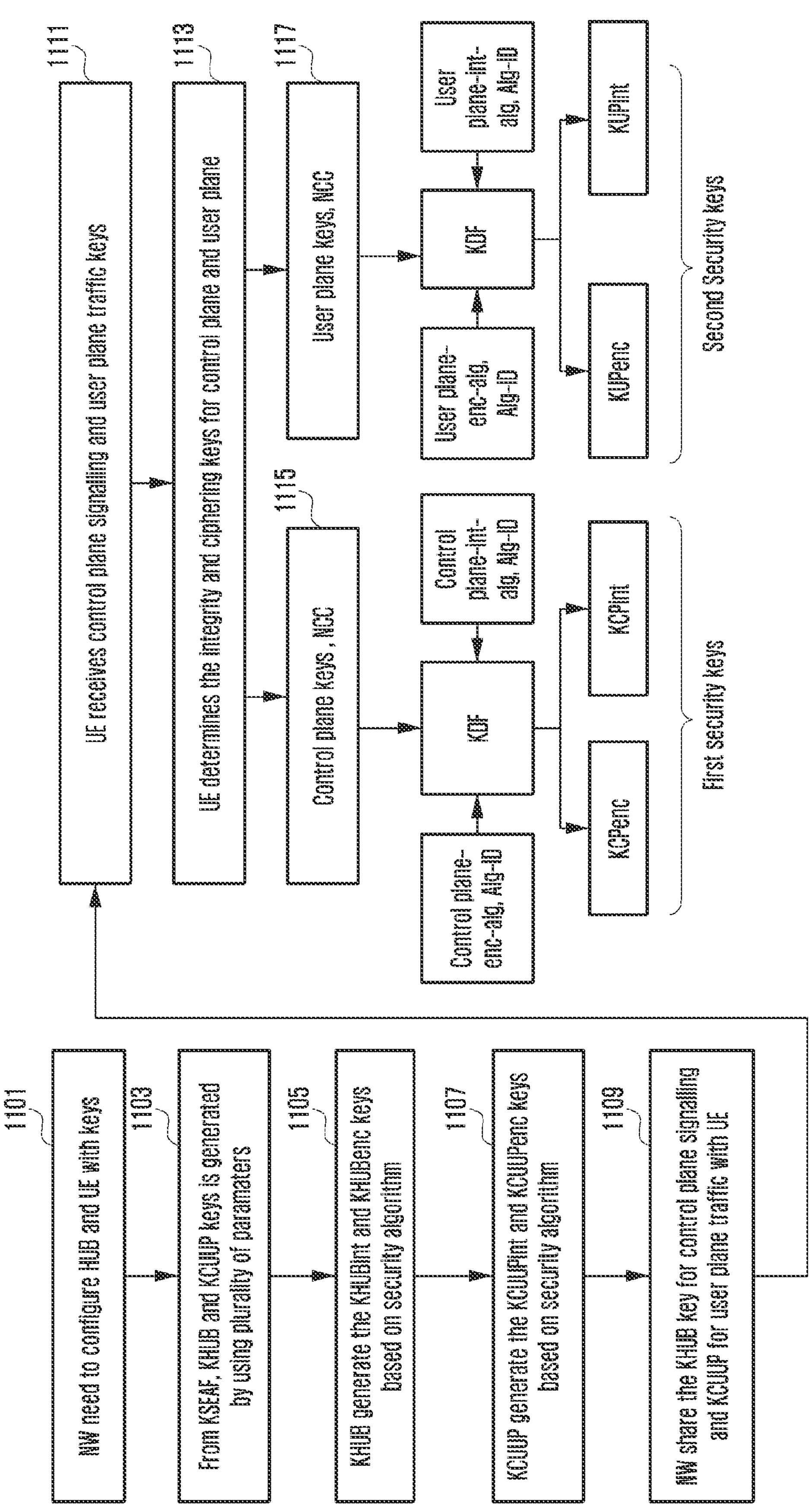
FIG. 11 is a diagram illustrating an example process for key generation at the network and the UE in the 6G architecture of FIG. 4 when HUB is in the trusted area and the Hub and the CU-UP perform the control and user plane security, according to various embodiments.

FIG. 11 is a diagram illustrating an example process 1100 for key generation at the network and the UE in the 6G architecture of FIG. 4 when HUB is in the trusted area and the Hub and the CU-UP perform the control and user plane security, according to various embodiments. According to an embodiment, process 1100 depicts the process for option 1 of FIG. 6. According to an embodiment, the Hub 409 is in the trusted area and the determined network entity, as per step 1003 of FIG. 10, are the Hub 409 and the CU-UP 415.

At operation 1101, the network 409 configures the HUB 409 and the UE 401 with keys.

At operation 1103, the Hub 409 is configured to derive the KHUB and KCUUP keys from an anchor key e.g., KSEAF based on the plurality of parameters. According to an embodiment, the KSEAF key is a key for SEAF. In a non-limiting example, the plurality of parameters includes at least a combination of physical cell id (PCI), a length of PCI, a length of an Absolute Radio Frequency Channel Number downlink (ARFCN-DL), a length of a next hope (NH), an HUB identification (ID), and a transmit-receive points (TRP) ID.

After generation of the KHUB, at operation 1105, the Hub 409 is configured to generate KHUBint and KHUBenc keys based on generated KHUB. The generation of the KHUBint and KHUBenc keys utilizes the security algorithm. The security algorithms utilized herein may be any existing security algorithm like AES, SNOW 3G or quantum cryptography algorithm, and the like.

At operation 1107, the Hub 409 is configured to generate, a KCUUPint and a KCUUPenc keys based on generated KCUUP. The generation of the KCUUPint and KCUUPenc keys utilizes the security algorithm. The security algorithms utilized herein may be any existing security algorithm like AES, SNOW 3G or quantum cryptography algorithm, and the like.

At operation 1109, the NW transmits the KHUB key for control plane signaling and KCUUP for user plane traffic to the UE 401 through RRC signaling message or any layer 2 or layer 1 message. The RRC signalling message further includes information related to security configuration.

Figure 12:
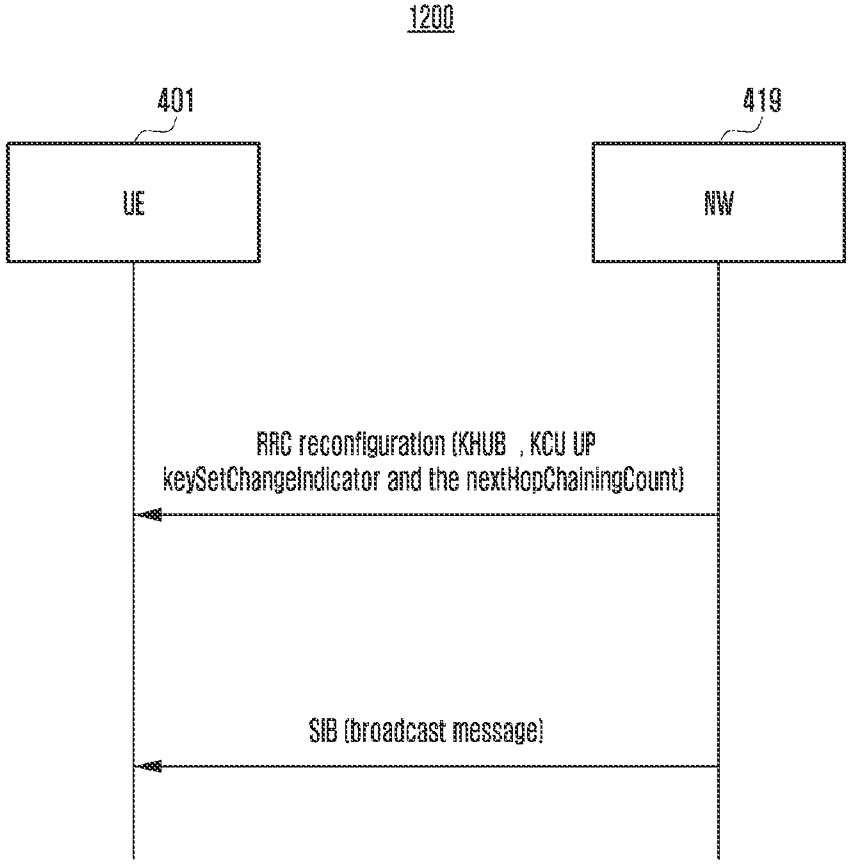
FIG. 12 is a signal flow diagram illustrating an example of sharing the security keys by the network to the UE, according to various embodiments.

FIG. 12 is a signal flow diagram illustrating an example of sharing the security keys by the network to the UE, according to various embodiments. As per operation 1109, the NW transmits the KHUB key for control plane signaling and KCUUP for user plane traffic to the UE 401 through RRC signaling message or any layer 2 or layer 1 message. According to an embodiment, the RRC handles the configuration of the AS security parameters which are part of the AS configuration. The AS configuration may include the integrity protection algorithm, the ciphering algorithm. If the integrity protection and/or ciphering is enabled for a DRB and parameters for example the KHUB, a KCUUP keySetChangeIndicator, the nextHopChainingCount, which are used by the UE to determine the AS security keys upon reconfiguration with sync (e.g., with key change), connection re-establishment and/or connection resume. As shown in FIG. 12, an RRC reconfiguration message is sent to the UE 401 by the NW 419. According to an embodiment, the RRC reconfiguration message includes KHUB, KCUUP keys, KCU UP keySetChangeIndicator, and the nextHopChainingCount. Further, the security configuration indicates the security algorithm and the key to use for the signaling and data radio bearers configured with a list in an IE RadioBearerConfig.

According to an embodiment, at operation 1111, UE 401 is configured to receive control plane signaling and user plane traffic key. In particular, the UE 401 is configured to receive the KHUB and the KCUUP keys.

Thereafter, at operation 1113, the UE 401 determines a first integrity (KCPint) and a first ciphering (KCPenc) keys for the control plane (CP) based on the KHUB, the KCUUP keys, and the KDF. In the similar way, the UE 401 determines a second integrity (KUPint) and a second ciphering (KUPenc) keys for the user plane (UP) based on received first security key (KHUB), the second security key (KCUUP), and the key derivation factor (KDF).

The operation 1113 includes operation 1115. At operation 1115 the control panel keys are determined through key derivation function (KDF) which involves inputs as an algorithm for security and integrity and includes parameters such as information of a protocol for security and integrity, a key length, a protocol identification (ID), next hop count (NCC), a count the same with respective modules. According to an embodiment, these parameters may be shared by the network.

Similarly, the operation 1113 includes operation 1117. At operation 1117 the user panel keys are determined through key derivation function (KDF) which involves inputs as algorithm for security and integrity, and includes parameters such as information of a protocol for security and integrity, a key length, a protocol identification (ID), next hop count (NCC), a count the same with respective modules. According to an embodiment, these parameters may be shared by the network. According to an embodiment, the control plane keys and the user plane keys are shared with respective modules.

Figure 13:
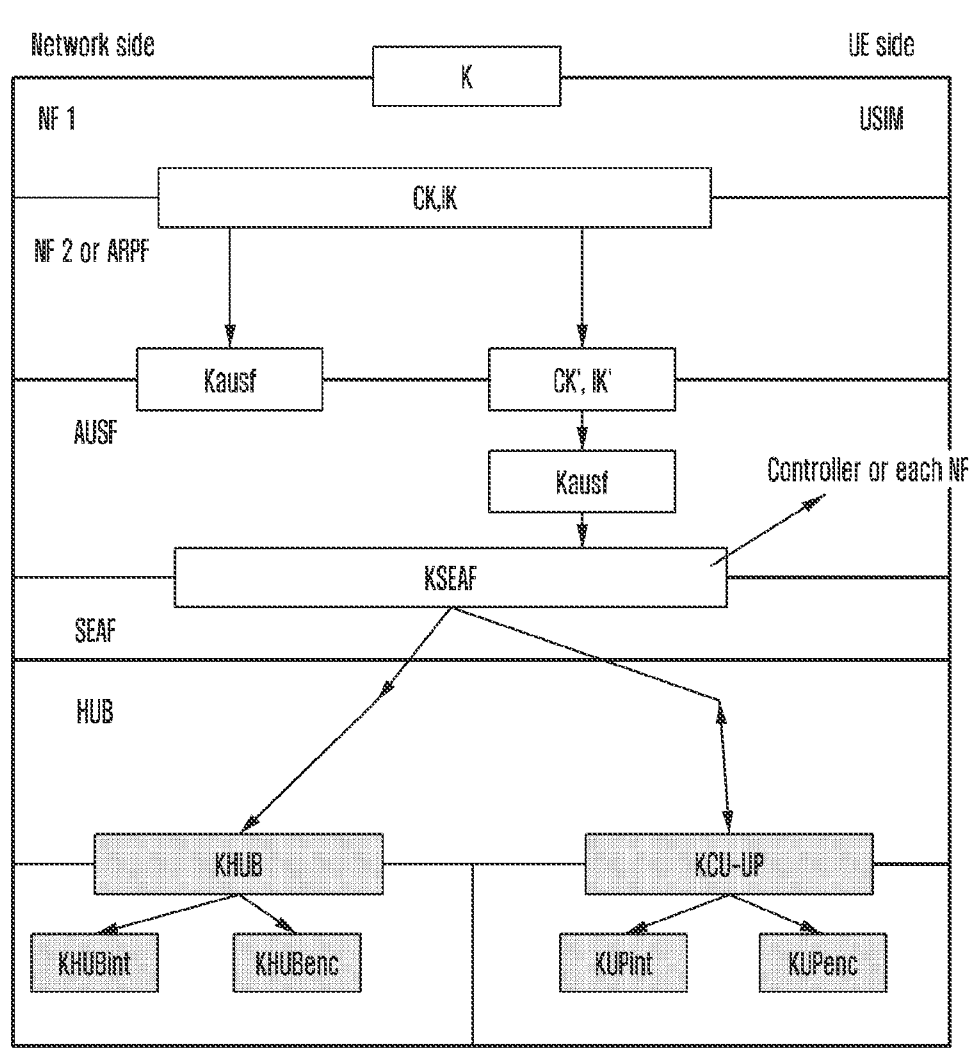
FIG. 13 is a diagram illustrating an example key hierarchy generation in 6G architecture when HUB is in a trusted area and HUB and CU-UP will perform control and user plane security, according to various embodiments.

FIG. 13 is a diagram 1300 illustrating example key hierarchy generation in 6G architecture when HUB is in the trusted area and HUB and CU-UP will perform control and user plane security, according to various embodiments.

The keys related to authentication include the keys: K, CK/IK. In the case of EAP-AKA', the keys CK', IK' are derived from CK, IK as specified TS 33.501. The key hierarchy as shown in FIG. 13 includes the keys: KAUSF, KSEAF, KHUB, KHUBint, KHUBenc, KUPint and KUPenc. The generation of the keys is explained in FIGS. 10, 11, and 13.

The keys for AUSF in the home network is KAUSF. The KAUSF is a key derived by:

- the UE and the AUSF from CK', IK' in case of EAP-AKA', CK' and IK' is received by AUSF as a part of transformed AV from ARPF; or,
- the UE and ARPF from CK, IK in case of 6G AKA, KAUSF is received by AUSF as a part of the 5G HE AV from ARPF.

The KSEAF is an anchor key derived by the UE and the AUSF from the KAUSF. The KSEAF is provided by the AUSF to the SEAF in the serving network. The KSEAF is a controller entity that may generate keys for the NF or network entity that performs security.

Key for HUB in the serving network is the KHUB. The KHUB is a key derived by the UE and the SEAF from the KSEAF. The KHUB is further derived by the UE and source HUB when performing horizontal key derivation.

Keys for control plane signaling are KHUBint and KHUBenc. The KHUBint is a key derived by the UE and the HUB from the KHUB, which shall only be used for the protection of control signaling with a particular integrity algorithm. The KHUBenc is a key derived by the UE and the HUB from the KHUB, which shall only be used for the protection of control signaling with a particular encryption algorithm.

The Key for CU-UP or NF in serving network is the KCUUP. The KCUUP is a key derived by the UE and the SEAF from the KSEAF. The KCUUP is further derived by the UE and source CU-UP or NF or HUB handling CU-UP when performing horizontal key derivation.

The Keys for UP traffic (CU-UP) are KUPenc and KUPint:—KUPenc is a key derived by the UE and the CU-UP or the NF or the HUB from the KCUUP, which shall only be used for the protection of UP traffic with a particular encryption algorithm. The KUPint is a key derived by the UE and the CU-UP or the NF from the KCUUP, which shall only be used for the protection of the UP traffic between the UE and the CU-UP or the NF with a particular integrity algorithm. The generated keys are a part of the proposed TS33.501 3GPP specification.

According to an embodiment, for every key in a network entity, there is a corresponding key in the UE. NW will share these keys through any RAN or core network message like RRC or NAS-specific message. NW will also share keySetChangeIndicator and the nextHopChainingCount, which are used by the UE to determine the security keys upon reconfiguration with sync (with key change), connection re-establishment and/or connection resume. The UE determines the keys for signaling and user plane traffic based on these parameters.

UE wants to send the data to the network, if it is control plane data, the UE performs integrity and ciphering on these messages and also may add NF headers based on type of signaling bearer configuration or logical channel mapping on specific messages. Once the HUB at the network receives the data, the Hub will perform integrity and ciphering and create the new header for service-based interface e.g., HTTP header and send the data to the particular NF.

Now, when the NW wants to send some data to the UE, in this case, NF generates the message and sends it to the HUB. The HUB on receiving the same removes the SBI interface header e.g., removes the header for HTTP. It then adds the NF header, if needed, and performs integrity and ciphering before sending the data to the UE.

The KHUB can be also calculated based on the plurality of parameters as explained above.

Figure 14:
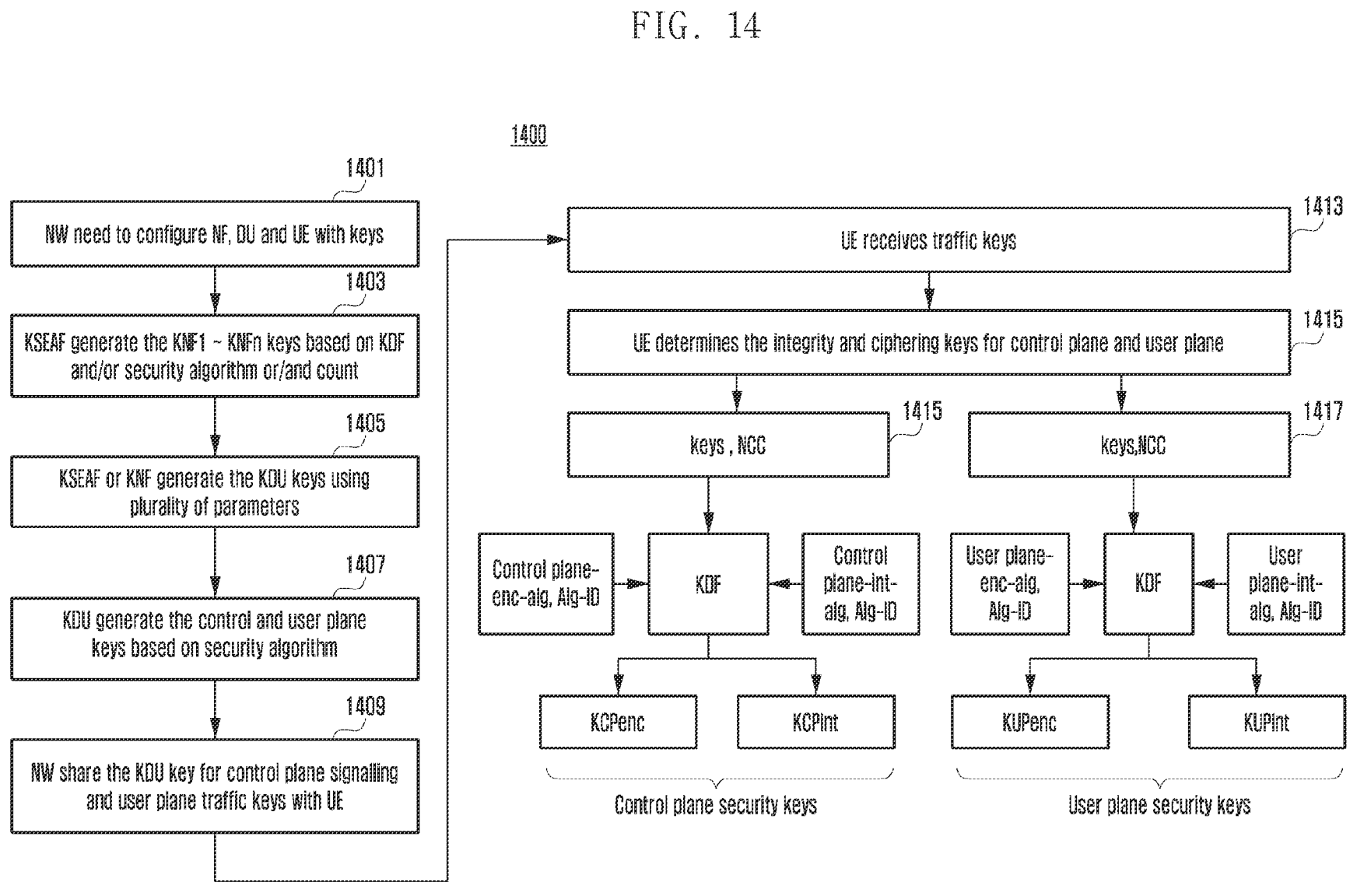

FIG. 14 is a diagram illustrating an example process 1400 for key generation at the network and the UE in the 6G architecture of FIG. 4 when HUB is in the trusted area and the DU and the CU-UP perform the control and user plane security, according to various embodiments. According to an embodiment, process 1400 depicts the process for option 4 of FIG. 6. According to an embodiment, the Hub 409 is in the trusted area and the determined network entity, as per step 1003 of FIG. 10, is the DU 405 and the CU-UP 415.

At operation 1401, the NW 419 configures the NFs 403, DU 405, and UE 401 with keys.

At operation 1403, each of the corresponding network function (NF) nodes 403 is configured to derive a KNF from an anchor key e.g., KSEAF based on at least one of the KDF, a security protocol, and the NH. In particular, the KSEAF generates the KNF1~KNFn keys based on the KDF and/or security algorithm/protocols, the NH count as in this case each NF will perform the security.

At operation 1405, the DU 405 is configured to generate a KDU based on the plurality of parameters and the derived KNF for each of the corresponding NF 403. In particular, the KSEAF or KNF generates the KDU keys Key generation. The Key generation is based on combination of multiple factors/plurality of parameters like physical cell id (PCI), a length of PCI, a length of an Absolute Radio Frequency Channel Number downlink (ARFCN-DL), a length of a next hope (NH), an HUB identification (ID), and a transmit receive points (TRP) ID.

At operation 1407, the DU 405 is configured to generate KDUint, KDUenc, for the DU 405 and KUPint, KUPenc for the CUUP 415 as integrity and ciphering keys are based on the derived KDU. The KDUint and KDUenc are generated based on various existing security algorithms like AES, SNOW 3G, or quantum cryptography algorithms. According to this embodiment, the generation of the KDUint, KDUenc, for the DU 405 KUPint, KUPenc for the CUUP is shown in path 1303 of FIG. 15.

According to various embodiments, the DU 405 is configured to generate the KDU directly from the KESEAF. This is shown in path 1301 of FIG. 15. Thereafter, similar to operation 1407, the DU 405 is configured to generate KDUint, KDUenc, for the DU 405 and KUPint, KUPenc for the CUUP 415 as integrity and ciphering keys are based on the derived KDU.

At operation 1409, NW 419 shares the KDU keys (ie. KDUint, KDUenc,) for control plane signaling and user plane traffic keys (e.g., KUPint, KUPenc) with UE 401 through RRC signaling message or any layer 2 or layer 1 message. The RRC signalling message further includes information related to the security configuration. The operational flow for sharing the security keys by the network to the UE is shown in FIG. 12 above and is analogous to the operation 1409. However, for option 4, the RRC reconfiguration messages the KDU keys (ie. KDUint, KDUenc,) for control plane signaling and user plane traffic keys (i,e KUPint, KUPenc) keySetChangeIndicator, and the nextHopChainingCount. Further, the security configuration indicates the security algorithm and the key to use for the signalling and data radio bearers configured with a list in an IE RadioBearerConfig.

At step 1413, UE 401 receives the KDU keys (ie. KDUint, KDUenc) for the control plane signaling and the user plane traffic keys (e.g., KUPint, KUPenc), through the RRC signaling message or any layer 2 or layer 1 message or any other message.

At step 1415 and 1417, UE 401 determines the integrity and ciphering keys for control plane and user plane. In particular, the UE 401 determines first integrity (KCPint) and a first ciphering (KCPenc) keys for control plane (CP) based on the received KDU keys (ie. KDUint, KDUenc), and a key derivation factor (KDF). In the similar way, the UE 401 determines a second integrity (KUPint) and a second ciphering (KUPenc) keys for the user plane (UP) based on the received the user plane traffic keys (i.e KUPint, KUPenc), and a key derivation factor (KDF)

The operation 1415 includes operation 1117. At operation 1117 the control panel keys are determined through key derivation function (KDF) which involves inputs as an algorithm for security and integrity, and includes parameters such as information of a protocol for security and integrity, a key length, a protocol identification (ID), next hop count (NCC), a count the same with respective modules. According to an embodiment, these parameters may be shared by the network.

Similarly, the operation 1415 includes operation 1119. At operation 1119 the user panel keys are determined through key derivation function (KDF) which involves inputs as an algorithm for security and integrity, and includes parameters such as information of a protocol for security and integrity, a key length, a protocol identification (ID), next hop count (NCC), a count the same with respective modules. According to an embodiment, these parameters may be shared by the network. According to an embodiment, the control plane keys and the user plane keys are shared with respective modules.

Figure 15:
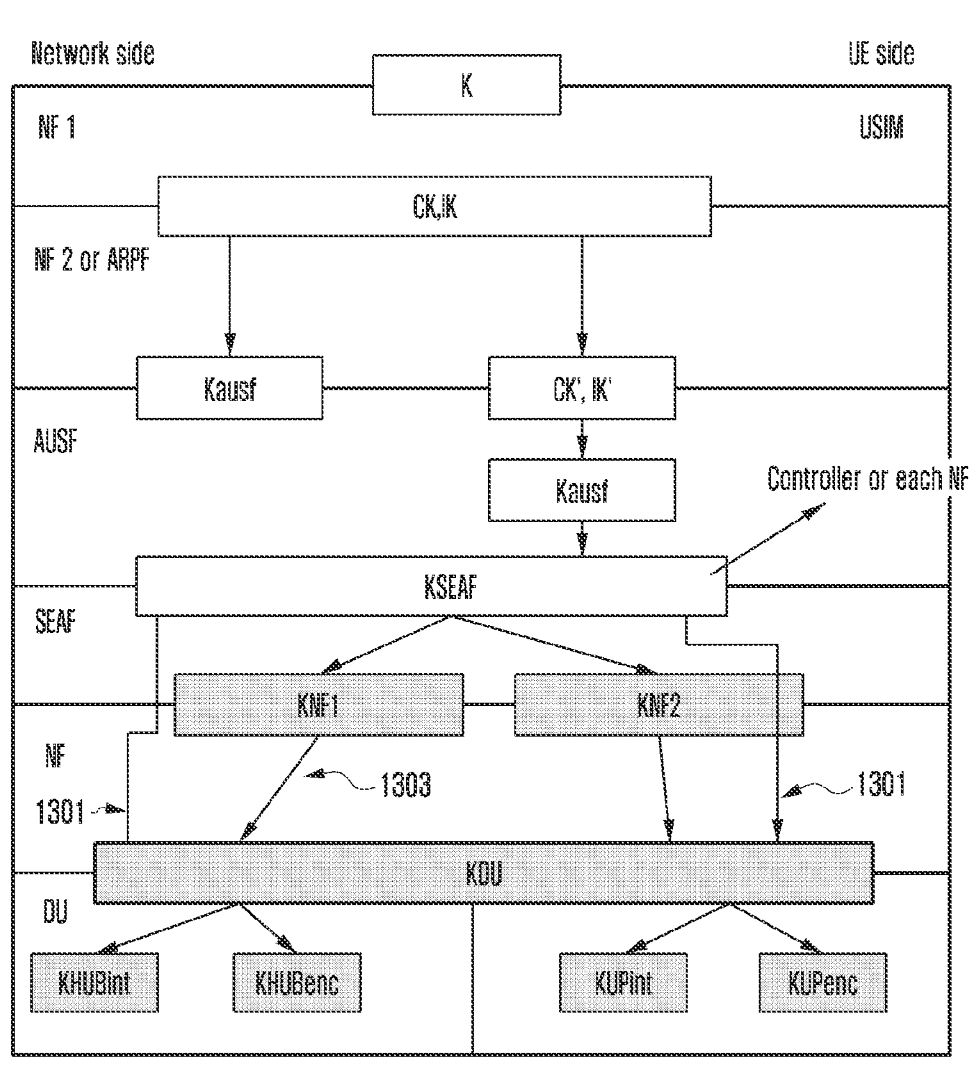
FIG. 15 is a diagram illustrating example key hierarchy generation in 6G architecture when HUB is in a trusted area and DU and CU-UP will perform control and user plane security, according to various embodiments.

FIG. 15 is a diagram 1500 illustrating example key hierarchy generation in 6G architecture when HUB is in a trusted area and DU and CU-UP will perform control and user plane security, according to various embodiments.

The keys related to authentication include the keys: K, CK/IK. In the case of EAP-AKA', the keys CK, IK are derived from CK, IK as specified TS 33.501. The key hierarchy as shown in FIG. 15 includes the keys: KAUSF, KSEAF, KNF, KDU, KDUint, KDUenc, KUPint, and KUPenc. The generation of the keys is explained through FIGS. 10, 14, and 15.

Keys for AUSF in home network is KAUSF. The KAUSF is a key derived by:

the UE and the AUSF from CK, IK in case of EAP-AKA', CK and IK is received by AUSF as a part of transformed AV from ARPF; or, the UE and ARPF from CK, IK in case of 6G AKA, KAUSF is received by AUSF as a part of the 5G HE AV from ARPF.

The KSEAF is an anchor key derived by the UE and the AUSF from the KAUSF. The KSEAF is provided by the AUSF to the SEAF in the serving network. The KSEAF is a controller entity that may generate keys for the NF or network entity that performs security.

Key for NF in serving network is KNF. The KNF is a key derived by the UE and the SEAF from the KSEAF. The KNF is further derived by the UE and source NF when performing horizontal key derivation.

Key for DU in serving network is KDU. The KDU is a key derived by the UE and SEAF from KSEAF or from UE and KNF. KDU is further derived by UE and source DU when performing horizontal key derivation.

Keys for control plane signaling are KDUint and KDUenc. The KDUint is a key derived by UE and DU from KDU, which shall only be used for the protection of control signaling with a particular integrity algorithm. The KDUenc is a key derived by UE and DU from KDU, which shall only be used for the protection of control signaling with a particular encryption algorithm.

Keys for UP traffic (CU-UP) are KUPenc and KUPint. The KUPenc is a key derived by ME and DU and/or NF or KSEAF and/or KDU, which shall only be used for the protection of UP traffic with a particular encryption algorithm. The KUPint is a key derived by ME and DU and/or NF from KDU, which shall only be used for the protection of UP traffic between ME and DU and/or NF with a particular integrity algorithm.

According to an embodiment, for every key in a network entity, there is a corresponding key in the UE. NW shares these keys through any RAN or core network message like RRC or NAS specific message. The NW also share keySetChangeIndicator and the nextHopChainingCount, which are used by the UE to determine the security keys upon reconfiguration with sync (with key change), connection re-establishment and/or connection resume. The UE determines the keys for signaling and user plane traffic based on these parameters.

According to an embodiment, the UE wants to send the data to the network, if it is control plane data it will perform integrity and ciphering on these messages and also may add NF headers based on type of signaling bearer configuration or logical channel mapping on specific messages at the data layer. NW once receives the data will perform integrity and ciphering at DU and then send the data to HUB, it will create the new header for the service based interface e.g., HTTP header, and send the data to a particular NF.

According to an embodiment, when the NW wants to send some data to the UE, in this case, NF generates the message and sends it to the HUB. The HUB on receiving the same remove the SBI interface header e.g., remove header for HTTP. It then adds the NF header and then sends it to the DU. The DU will perform integrity and ciphering before sending data to the UE.

The KDU is also calculated based on the plurality of parameters as explained above. The KDU may also be calculated based on the NH derivation which may be provided by NF or KSEAF.

FIG. 16 is a flowchart illustrating an example process for key generation at the network and sharing it with the UE in the 6G architecture of FIG. 4 when the HUB is in the non-trusted area, according to various embodiments. According to an embodiment, method 1600 is implemented in the 6G architecture of FIG. 4. Further, method 1600 may be performed by the network entities included in the network. In a non-limiting example, the network entities included are the Hub 409, the DU 405, the CU-UP 415, or any control entity. According to an embodiment, each of the network entities may include one or more processor(s) configured to perform method 1600. Thus, the operations of each of the network entities and its corresponding processor (s) are the same and may be referred interchangeably throughout the disclosure.

According to an embodiment, in operation 1601, when a HUB is in a trusted area, the processor 2702 is configured to determine whether one or more network functions (NFs) 403 are configured to perform the security operation. The determination is based on a generation of the message by the corresponding one or more NFs. The network entities (NFs) 403 includes HUB, a Central Unit User Plane (CU-UP), one or more network entities (NF) node, and a Distributed Unit (DU). Operation 1601 corresponds to step 805 of FIG. 8. Thereafter, at operation 1603, the determined network entity e.g., the HUB 409, a Central Unit User Plane (CU-UP) 415, is configured to generate a plurality of security keys. According to an embodiment, the generated security keys are the integrity and ciphering keys of the respective network entities that perform the security operations for their respective control plane signaling and user plane signaling. After the generation of the security keys, the processor 2702, at operation 1605, is configured to share the generated plurality of security keys with the UE 401. The UE then derives the control plane keys and the user plane keys through a key derivation function (KDF) based on the received integrity and ciphering keys.

FIG. 17 is a diagram illustrating an example process 1700 for key generation at the network and the UE in the 6G architecture of FIG. 4 when HUB is in the non-trusted area and the one or more network functions (NF) node, Hub, and the CU-UP perform the control and user plane security, according to various embodiments. According to an embodiment, process 1700 depicts the process for option 2 of FIG. 6. According to an embodiment, the Hub 409 is in the non-trusted area and the determined network entity, as per step 1601 of FIG. 16, are the one or more network functions (NF) node, the Hub 409 and the CU-UP 415.

At Operation 1701, NW configures the NF 403, HUB 409 and UE 401 with keys.

At step 1703, each of corresponding network function (NF) nodes 403 is configured to derive a corresponding KNF from an anchor key i.e KSEAF based on at least one of a key deriving factor (KDF), a security protocol, and an NH. This is shown in path 1801 of FIG. 18. In particular, the KSEAF generates the KNF1~KNFn keys based on security algorithm/protocol, and/or NH count as in this case each NF performs the security operation.

Thereafter at operation 1705, each of the corresponding network function (NF) nodes is configured to generate a corresponding KNFint and a corresponding KNFenc based on the corresponding KNF and the security protocol. This is shown in path 1803 of FIG. 18.

At operation 1707, each of the corresponding network function (NF) nodes is configured to generate a KHUB and a KCUUP based on a plurality of parameters and the corresponding KNF as derived in 1703. As an example, the plurality of parameters includes at least a combination of physical cell id (PCI), a length of PCI, a length of an Absolute Radio Frequency Channel Number downlink (ARFCN-DL), a length of a next hope (NH), an HUB identification (ID), and a transmit receive points (TRP) ID.

According to various embodiments, the KHUB and KCUUP keys are derived from the anchor key e.g., KSEAF and the plurality of parameters by the Hub 409. This is shown in path 1805 of FIG. 18.

At operation 1709, the Hub 409 is configured to generate KHUBint and KHUBenc as integrity and ciphering keys for Hub based on the KHUB as generated at operation 1707 and the security protocol.

At operation 1711, the Hub 409 is configured to generate KUPint and a KUPenc as integrity and ciphering keys for user plane as a based on the KCUUP as generated at operation 1707 and the security protocol.

According to various embodiments, the HUB is configured to generate the KHUBint and the KHUBenc based on the KHUB and the security protocol, where the KHUB is directly derived from KSEAF. This is shown in the path 1807.

According to various embodiments, the HUB is configured to generate KCUUPint and a KCUUPenc for user plane based on the KCUUP and the security protocol where the KCUUP is directly derived from KSEAF. This is shown in the path 1809.

At Operation 1713, the network 419 is configured to transmit KCUUP, the KHUBint, KHUBenc through the RRC signalling or any layer 2 or layer 1 message or any other message. Transmitting KCCUP implies that KUPint and KUPenc for user plane traffic is also transmitted.

At operation 1715, UE receives control plane signalling and user plane traffic keys and has to determine the ciphering and integrity keys. The control plane signalling and user place signalling includes security keys: KHUBint, the KHUBenc, KCUUP.

At operation 1717, the UE determines the integrity and ciphering keys for control plane and user plane. UE determines two level control plane, one may be used by lower layers say like layer 2 or layer 1 and other may be shared with upper layers which is generating the message. The two level control plane is shown through the operations 1719, 1723, 1725.

At operation 1721, user plane keys are determined through key derivation function which involves inputs as algorithm for security and integrity, keys or count and share the same with respective modules. In particular, the UE determines a first integrity key (KUPint) and a first cyphering key (KUPenc) for user plane (UP) based on the KCUUP and a key derivation factor (KDF).

At operations 1719 through the operation 1725, the UE is further configured to determine a second integrity key (KCPint) and a second ciphering key (KCPenc) for control plane (CP) based on the first security key (KCUUP) and the key derivation factor (KDF), wherein the second integrity key and the second cyphering key is utilized by a lower network layers for security protocols. Determining a third integrity key and a third cyphering key for control plane (CP) based on the first security key (KCUUP) and the key derivation factor (KDF), wherein the third integrity key and the third cyphering key is utilized by an upper network layers for security protocols.

Figure 18:
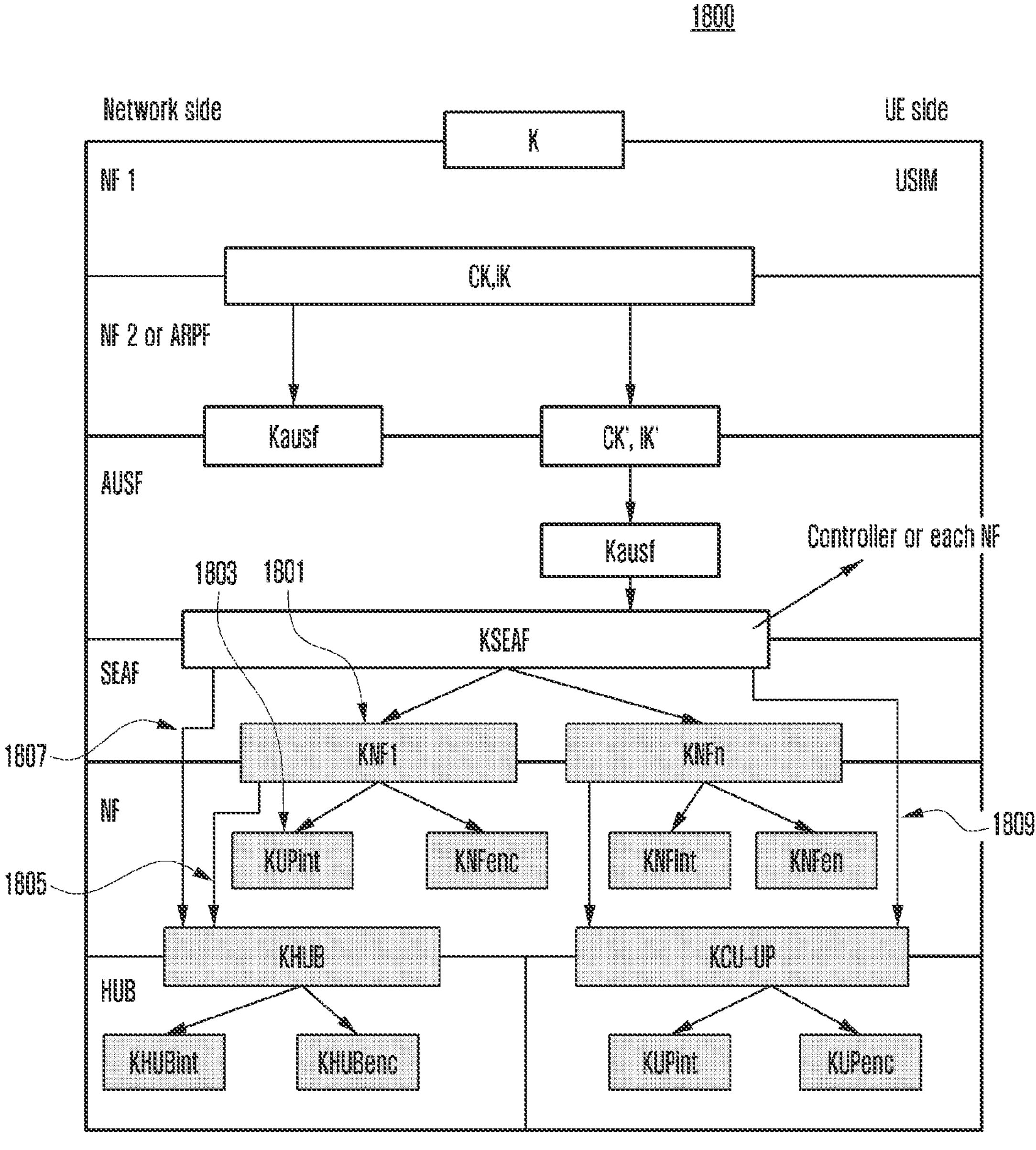
FIG. 18 is a diagram illustrating example key hierarchy generation in 6G architecture when HUB is in untrusted area and both HUB and NF has to perform control plane security and CU-UP performs user plane security, according to various embodiments.

FIG. 18 is a diagram 1800 illustrating an example key hierarchy generation in 6G architecture when HUB is in not in trusted area and both HUB and NF has to perform control plane security and CU-UP performs user plane security, according to various embodiments.

The keys related to authentication include the keys: K, CK/IK. In case of EAP-AKA', the keys CK', IK' are derived from CK, IK as specified TS 33.501. The key hierarchy as shown in FIG. 18 includes the keys: KAUSF, KSEAF, KNF, KNFint, KNFenc, KHUB, KHUBint, KHUBenc, KUPint and KUPenc.

Keys for AUSF in home network is KAUSF. The KAUSF is a key derived by UE and AUSF from CK', IK' in case of EAP-AKA', CK and IK is received by AUSF as a part of transformed AV from ARPF. Alternatively, the KAUSF is derived by UE and ARPF from CK, IK in case of 6G AKA, KAUSF is received by AUSF as a part of the 5G HE AV from ARPF.

Further, the KSEAF is an anchor key derived by UE and AUSF from KAUSF. KSEAF is provided by AUSF to the SEAF in the serving network. KSEAF is a controller entity which can generate keys for NF or network entity that need to perform security.

Key for NF in serving network is KNF. The KNF is a key derived by the UE and SEAF from KSEAF. KNF is further derived by UE and source HUB when performing horizontal key derivation.

Keys for NF control plane signaling KNFint and KNFenc. The KNFint is a key derived by UE and NF from KNF, which shall only be used for the protection of control signaling with a particular integrity algorithm. The KNFenc is a key derived by UE and NF from KNF, which shall only be used for the protection of control signaling with a particular encryption algorithm.

Key for HUB in serving network is KHUB. The KHUB is a key derived by UE and SEAF from KSEAF. The other option is it can be derived by UE and NF from KNF. The KHUB is further derived by UE and source HUB when performing horizontal key derivation.

Keys for control plane signaling are KHUBint and KHUBenc. The KHUBint is a key derived by UE and HUB from KHUB, which is used for the protection of control signaling with a particular integrity algorithm. The KHUBenc is a key derived by UE and HUB from KHUB, which is used for the protection of control signaling with a particular encryption algorithm.

Key for CU-UP or NF in serving network is KCUUP. The KCUUP is a key derived by UE and SEAF from KSEAF or from UE and NF from KNF. KCUUP is further derived by UE and source CU-UP or NF or HUB handling CU-UP when performing horizontal key derivation.

Keys for UP traffic (CU-UP) are KUPenc and KUPint. The KUPenc is a key derived by UE and CU-UP or NF (say NF which is handling session like SMF) or HUB from KCUUP, which is used for the protection of UP traffic with a particular encryption algorithm. The KUPint is a key derived by UE and CU-UP or NF from KCUUP, which is used for the protection of UP traffic between UE and CU-UP or NF with a particular integrity algorithm.

According to an embodiment, for every key in a network entity, there is a corresponding key in the UE. The NW shares these keys through any RAN or core network message like RRC or NAS specific message. The NW also shares keySetChangeIndicator and the nextHopChainingCount, which are used by the UE to determine the security keys upon reconfiguration with sync (with key change), connection re-establishment and/or connection resume. The UE determines the keys for signaling and user plane traffic based on these parameters.

UE wants to send the data to the network, if it is control plane data it performs integrity and ciphering on these messages and also may add NF headers based on the type of signaling bearer configuration or logical channel mapping on specific messages. There is another level of control plane ciphering which is done at some data layer by the UE. The UE performs two level of ciphering and then send data to the network. Once the HUB at the network receives the data, it performs integrity and ciphering and creates the new header for service based interface e.g., HTTP header, and sends the data to a particular NF. Once NF receives the data it further performs ciphering and integrity based on keys stored at that NF.

When the NW wants to send some data to the UE, in this case the NF generates the message and performs integrity and ciphering, and then sends it to the HUB. The HUB on receiving the same removes the SBI interface header e.g., remove header for HTTP. It then adds the NF header, if required and performs integrity and ciphering before sending data to the UE.

The KHUB and KCUUP keys can be either derived from KNF like control management function or session management function or any other NF or they can be derived directly from KSEAF.

The KHUB can be also calculated based on parameters as disclosed above. It may also be calculated based on NH derivation which can be provided by NF or KSEAF along with keys either KNF or KSEAF.

FIG. 19 is a diagram illustrating an example process 1900 for key generation at the network and the UE in the 6G architecture of FIG. 4 when HUB is in the non-trusted area and the single network functions (NF) node, and the CU-UP perform the control and user plane security, according to various embodiments. According to an embodiment, process 1900 depicts the process for options 3 and 6 of FIG. 6. According to an embodiment, the Hub 409 is in the non-trusted area and the determined network entity, as per step 1601 of FIG. 16, is the network functions (NF) node, and the CU-UP 415.

At operation 1901, the NW configures the NF, HUB, and UE with keys.

Thereafter at operation 1903, the network function (NF) node 403 is configured to derive KNF from an anchor key e.g., KSEAF based on at least one of the KDF, a security protocol, and an NH.

Figure 20:
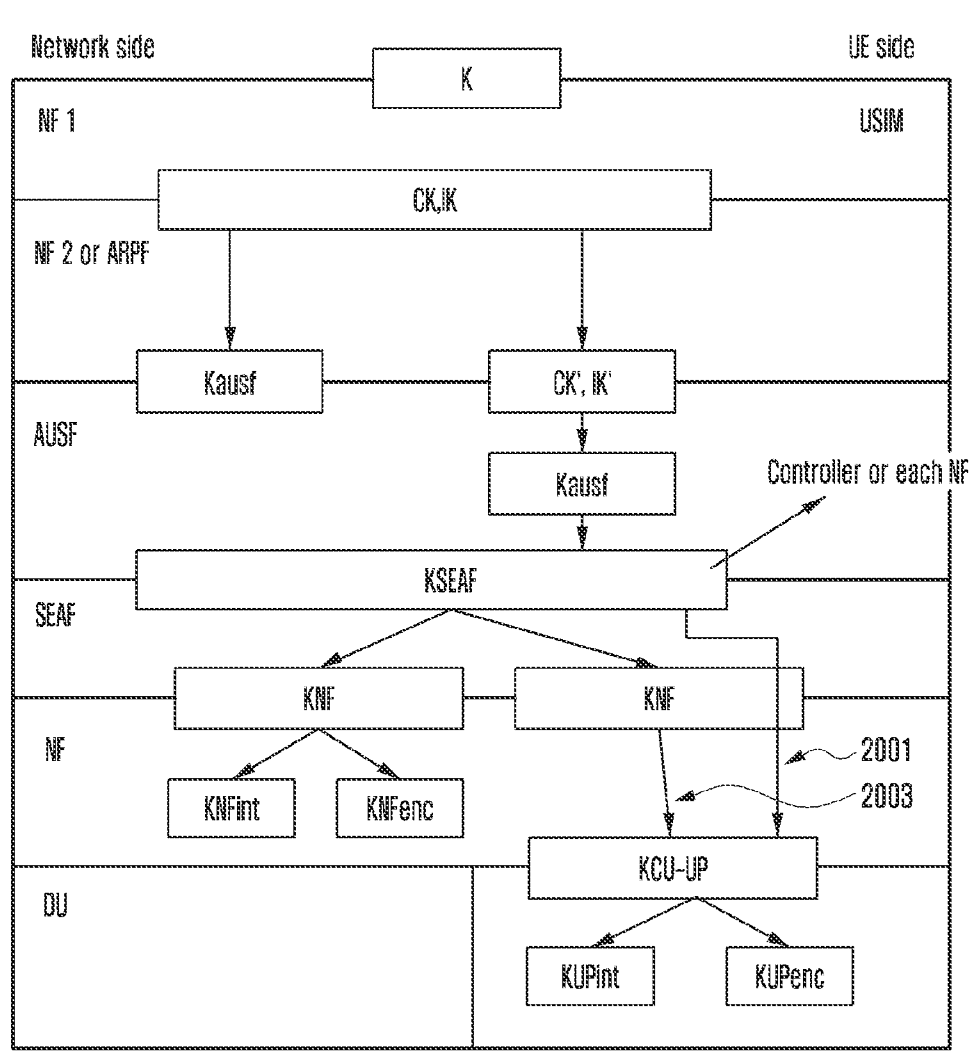
FIG. 20 is a diagram illustrating example key hierarchy generation in 6G architecture when HUB is not in a trusted area and both NF and CUUP have to perform control plane security and user plane security, according to various embodiments.

At operation 1905, the network function (NF) node is configured to generate a KNFint and a KNFenc based on the KNF and the security protocol. The generated KNFint and a KNFenc from the KNF are shown in FIG. 20.

At operation 1907, the network function (NF) node is configured to generate KCUUP based on a plurality of parameters and the KNF. This is shown in the path 2003 of FIG. 20. According to various embodiments, the network function (NF) node is configured to generate KCUUP based on a plurality of parameters and the KSEAF. This is shown in the path 2001 of FIG. 20. The plurality of parameters includes at least a combination of physical cell id (PCI), a length of PCI, a length of an Absolute Radio Frequency Channel Number downlink (ARFCN-DL), a length of a next hope (NH), an HUB identification (ID), and a transmit-receive points (TRP) ID.

At operation 1909, the network function (NF) node is configured to generate KUPint and a KUPenc based on the KNF and the security protocol. According to various embodiments, the network function (NF) node is configured to generate KUPint and a KUPenc based on the KCCUP and the security protocol. The generated KNFint and a KNFenc from the KCCUP are shown in FIG. 20.

At operation 1911, the network is configured to transmit the KNF, the KCUUP, KUPint, and the KUPenc to the UE via a RRC signaling message. The RRC signaling message further includes information related to security configuration. The transmission of sharing of the keys and RRC signaling is shown in FIG. 12, therefore for the sake of brevity details explanation is omitted here. Further, according to option 3, here in the RRC signaling message includes the KNF, the KCUUP, KUPint, and the KUPenc. In particular, the user plane security keys and control plane security keys are shared to the UE.

According to various embodiments, the method for the generation of the security keys for option 6 of FIG. 6 is the same as that of option 3. According to an embodiment, the only difference between option 3 and option 6 is that in option 3 the HUB may interact with to any of NFs and in option 6 the HUB may interact with only a single NF. The security operations performed at both options are the same.

Thereafter, at operation 1913, the UE 401 is configured to receive control plane signaling and user plane traffic keys. In particular, the UE 401 is configured to receive the KNF, the KCUUP, KUPint, and the KUPenc.

At step 1915, UE 401 determines the integrity and ciphering keys for the control plane and user plane. In particular, the UE 401 determines first integrity (KCPint) and a first ciphering (KCPenc) keys for control plane (CP) based on the received KNF keys and a key derivation factor (KDF). In a similar way, the UE 401 determines a second integrity (KUPint) and a second ciphering (KUPenc) keys for the user plane (UP) based on the received the user plane traffic keys (i.e KUPint, KUPenc), and a key derivation factor (KDF).

Operation 1915 includes operation 1917. At operation 1917 the control panel keys are determined through key derivation function (KDF) which involves inputs as algorithm for security and integrity, includes parameters such as information of a protocol for security and integrity, a key length, a protocol identification (ID), next hop count (NCC), a count the same with respective modules. According to an embodiment, these parameters may be shared by the network.

Similarly, the operation 1915 includes operation 1919. At operation 1119 the user panel keys are determined through key derivation function (KDF) which involves inputs as the algorithm for security and integrity, and includes parameters such as information of a protocol for security and integrity, a key length, a protocol identification (ID), next hop count (NCC), a count the same with respective modules. According to an embodiment, these parameters may be shared by the network. According to an embodiment, the control plane keys, and the user plane keys are shared with respective modules.

FIG. 20 is a diagram 2000 illustrating example key hierarchy generation in 6G architecture when HUB is in not in trusted area and both NF and CUUP have to perform control plane security and user plane security, according to various embodiments.

Key for NF in the serving network is KNF, the KNF is a key derived by the UE and the SEAF from KSEAF. KNF is further derived by UE and source NF when performing horizontal key derivation.

Keys for NF control plane signaling is KNFint and KNFenc. The KNFint is a key derived by UE and NF from KNF, which shall only be used for the protection of control signaling with a particular integrity algorithm. The KNFenc is a key derived by UE and NF from KNF, which shall only be used for the protection of control signaling with a particular encryption algorithm.

Key for CU-UP or NF in serving network is KCUUP. The KCUUP is a key derived by UE and SEAF from KSEAF or from UE and NF from KNF. KCUUP is further derived by UE and source CU-UP or NF or HUB handling CU-UP when performing horizontal key derivation.

Keys for UP traffic (CU-UP) is KUPenc and KUPint. The KUPenc is a key derived by UE and CU-UP or NF (say NF which is handling session like SMF) or HUB from KCUUP, which shall only be used for the protection of UP traffic with a particular encryption algorithm. The KUPint is a key derived by UE and CU-UP or NF from KCUUP, which shall only be used for the protection of UP traffic between UE and CU-UP or NF with a particular integrity algorithm.

FIG. 21 is a diagram illustrating an example process 2100 for key generation at the network and the UE in the 6G architecture of FIG. 4 when HUB is in the non-trusted area and one or more network functions (NF) nodes, and the CU-UP perform the control and user plane security, according to various embodiments. According to an embodiment, process 2100 depicts the process for option 5 of FIG. 6. According to an embodiment, the Hub 409 is in the non-trusted area and the determined network entity, as per step 1601 of FIG. 16, are one or more network functions (NF) node, and the CU-UP 415.

At operation 2101, the NW configures the NF, HUB and UE with keys.

Thereafter at operation 2103, each of the network functions (NF) node 403 is configured to derive a corresponding KNF from an anchor key i.e KSEAF based on at least one of the KDF, a security protocol, and an NH.

At operation 2105, each of the network functions (NF) node is configured to generate a corresponding KNFint and a KNFenc based on the corresponding KNF and the security protocol.

At operation 2107, a network function (NF) node from one or more network node is configured to generate KCUUP based on a plurality of parameters and the KNF. According to various embodiments, the network function (NF) node is configured to generate KCUUP based on a plurality of parameters and the KSEAF directly. This is shown in FIG. 22 at path 2201. The plurality of parameters includes at least a combination of physical cell id (PCI), a length of PCI, a length of an Absolute Radio Frequency Channel Number downlink (ARFCN-DL), a length of a next hope (NH), an HUB identification (ID), and a transmit receive points (TRP) ID At operation 2109, the network function (NF) node is configured to generate KUPint and a KUPenc based on the KNF and the security protocol. According to various embodiments, the network function (NF) node is configured to generate KUPint and a KUPenc based on the KCCUP and the security protocol. The generation of the KUPint and a KUPenc and the KUPint and a KUPenc is shown in FIG. 22.

At operation 2111, the network is configured to transmit the KNF, the KCUUP KUPint, and the KUPenc to the UE via a RRC signaling message. The RRC signaling message further includes information related to security configuration. The transmission of sharing of the keys and RRC signaling is shown in FIG. 12, therefore for the sake of brevity details, explanation is omitted here. Further, according to option 5, here in the RRC signaling message includes the KNF, the KCUUP KUPint, and the KUPenc.

Thereafter, at operation 2113, UE 401 is configured to receive control plane signaling and user plane traffic keys. In particular, the UE 401 is configured to receive the KNF, the KCUUP, KUPint, and the KUPenc. In particular, the user plane and control plane security keys are shared with the UE.

At step 2115, UE 401 determines the integrity and ciphering keys for control plane and user plane. In particular, the UE 401 determines first integrity (KCPint) and a first ciphering (KCPenc) keys for control plane (CP) based on the received KNF keys and a key derivation factor (KDF). In a similar way, the UE 401 determines a second integrity (KUPint) and a second ciphering (KUPenc) keys for the user plane (UP) based on the received the user plane traffic keys (i.e KUPint, KUPenc), and a key derivation factor (KDF).

The operation 2115 includes operation 2117. At operation 2117 the control panel keys are determined through key derivation function (KDF) which involves inputs as algorithm for security and integrity, and includes parameters such as information of a protocol for security and integrity, a key length, a protocol identification (ID), next hop count (NCC), a count the same with respective modules. According to an embodiment, these parameters may be shared by the network.

Similarly, the operation 2115 includes operation 2119. At operation 2119 the user panel keys are determined through key derivation function (KDF) which involves inputs as the algorithm for security and integrity, and includes parameters such as information of a protocol for security and integrity, a key length, a protocol identification (ID), next hop count (NCC), a count the same with respective modules. According to an embodiment, these parameters may be shared by the network. According to an embodiment, the control plane keys, and the user plane keys are shared with respective modules.

FIG. 22 is a diagram 2200 illustrating example key hierarchy generation in 6G architecture when HUB is not in trusted area and both NF and CUUP has to perform control plane security and user plane security, according to various embodiments.

Key for NF in serving network is KNF, the KNF is a key derived by the UE and the SEAF from KSEAF. KNF is further derived by UE and source NF when performing horizontal key derivation.

Keys for NF control plane signaling is KNFint and KNFenc. The KNFint is a key derived by UE and NF from KNF, which shall only be used for the protection of control signaling with a particular integrity algorithm. The KNFenc is a key derived by UE and NF from KNF, which shall only be used for the protection of control signaling with a particular encryption algorithm.

Key for CU-UP or NF in serving network is KCUUP. The KCUUP is a key derived by UE and SEAF from KSEAF or from UE and NF from KNF. KCUUP is further derived by UE and source CU-UP or NF or HUB handling CU-UP when performing horizontal key derivation.

Keys for UP traffic (CU-UP) is KUPenc and KUPint. The KUPenc is a key derived by UE and CU-UP or NF (say NF which is handling session like SMF) or HUB from KCUUP, which shall only be used for the protection of UP traffic with a particular encryption algorithm. The KUPint is a key derived by UE and CU-UP or NF from KCUUP, which shall only be used for the protection of UP traffic between UE and CU-UP or NF with a particular integrity algorithm.

Figure 23:
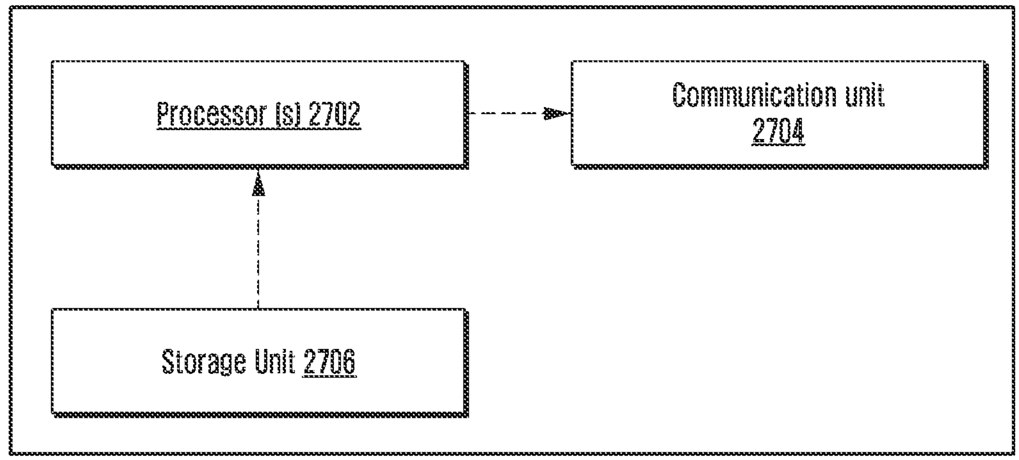
FIG. 23 is a block diagram illustrating an example configuration of a Network, according to various embodiments.

FIG. 23 is a block diagram illustrating an example configuration of a Network, according various embodiments. The Network 2700 may correspond to 3GPP PLMN-A and/or N3GPP PLMN-A, as discussed throughout this disclosure. The Network 2700 may include at least one processor (e.g., including processing circuitry) 2702, a storage unit (e.g., including a memory) 2706 (e.g., storage), and a communication unit (e.g., including communication circuitry) 2704 (e.g., communicator or communication interface). Further, the network 2700 may also include the Cloud-RAN (C-RAN), a Central Unit (CU), a core Network (NW), a Distributed unit (DU) or the any other possible network (NW) entity. The communication unit 2704 may perform one or more functions for transmitting and receiving signals via a wireless channel.

As an example, the processor 2702 may be a single processing unit or a number of units, all of which could include multiple computing units. The processor 2702 may be implemented as one or more microprocessors, microcomputers, microcontrollers, digital signal processors, central processing units, state machines, logic circuitries, and/or any devices that manipulate signals based on operational instructions. Among other capabilities, the processor 2702 is configured to fetch and execute computer-readable instructions and data stored in the memory. The processor 2702 may include one or a plurality of processors. At this time, one or a plurality of processors 2702 may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors 2702 may control the processing of the input data in accordance with a predefined operating rule or artificial intelligence (AI) model stored in the non-volatile memory and the volatile memory, e.g., memory unit 2706. The predefined operating rule or artificial intelligence model is provided through training or learning.

The storage unit 2706 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

According to various embodiments, the block diagram as shown in FIG. 23 may be referred for any network functions or network entities and the like.

Figure 24:
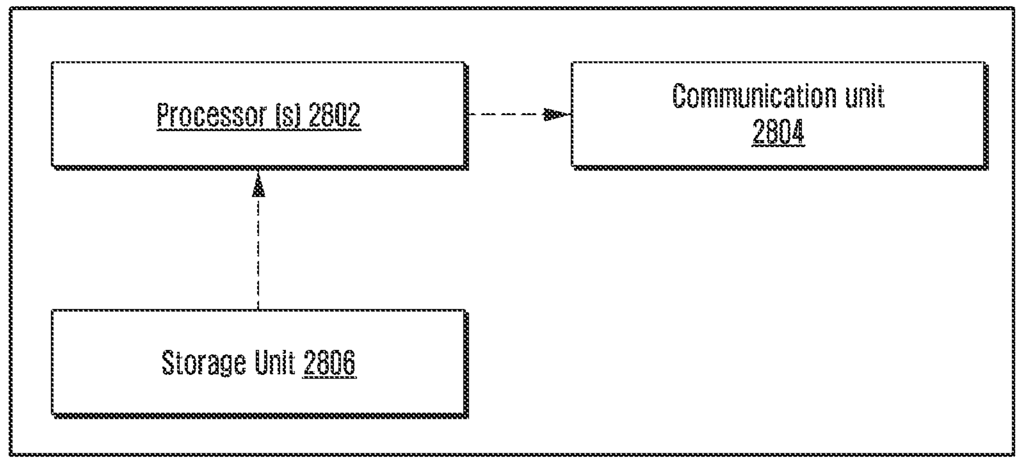
FIG. 24 is a block diagram illustrating an example configuration of user equipment (UE) in a wireless network, according to various embodiments.

FIG. 24 is a block diagram illustrating an example configuration of a user equipment (UE) in a wireless network, according to various embodiments. The configuration of FIG. 24 may be understood as a part of the configuration of the UE 2800. Hereinafter, it is understood that terms including "unit" or "module" at the end may refer to the unit for processing at least one function or operation and may be implemented in hardware, software, or a combination of hardware and software.

Referring to FIG. 24, the UE 2800 may include at least one processor (e.g., including processing circuitry) 2802, a communication unit (e.g., including communication circuitry) 2804 (e.g., communicator or communication interface), and a storage unit 2806 (e.g., storage including a memory). By way of example, the UE 2800 may be the User Equipment 401, such as a cellular phone or other device that communicates over a plurality of cellular networks (such as a 3G, 4G, a 5G or pre-5G, 6G network or any future wireless communication network). The communication unit 2804 may perform functions for transmitting and receiving signals via a wireless channel.

As an example, the processor 2802 may be a single processing unit or a number of units, all of which could include multiple computing units. The processor 2802 may be implemented as one or more microprocessors, microcomputers, microcontrollers, digital signal processors, central processing units, state machines, logic circuitries, and/or any devices that manipulate signals based on operational instructions. Among other capabilities, the processor 2802 is configured to fetch and execute computer-readable instructions and data stored in the memory. The processor 2802 may include one or a plurality of processors. At this time, one or a plurality of processors 2802 may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors 2802 may control the processing of the input data in accordance with a predefined operating rule or artificial intelligence (AI) model stored in the non-volatile memory and the volatile memory, e.g., memory unit 2806. The predefined operating rule or artificial intelligence model is provided through training or learning.

The memory 2806 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

In a firmware or software configuration, the method and the communication according to the embodiments of the present disclosure may be implemented in the form of modules, procedures, functions, etc. performing the above-described functions or operations. Instructions may be stored in a memory unit and executed by a processor. The memory unit may be located at the interior or exterior of the processor and may transmit and receive data to and from the processor via various known means.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

Those skilled in the art will appreciate that the operations described herein in the present disclosure may be carried out in other specific ways than those set forth herein without departing from essential characteristics of the present disclosure. The above-described embodiments are therefore to be construed in all aspects as illustrative and not restrictive. The scope of the disclosure should be determined by the appended claims, not by the above description, and all changes coming within the meaning of the appended claims are intended to be embraced therein.

The drawings and the forgoing description give examples of embodiments. Those skilled in the art will appreciate that one or more of the described elements may well be combined into a single functional element. Certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the disclosure or not, such as differences in structure, dimension, and use of material, are possible. The scope of embodiments is at least as broad as given by the following claims.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by a first network entity in a 6G communication network, the method comprising:
determining whether a HUB is in a trusted area or a non-trusted area of the 6G communication network;
determining, when the HUB is in the trusted area, the HUB and a Central Unit User Plane (CU-UP) as network entities to perform a security operation, and one or more network functions (NFs) generating a control plane signaling message as network entities that do not perform the security operation for the control plane signaling message; and
determining, when the HUB is in the non-trusted area, the one or more NFs and the HUB as network entities to perform a control plane security operation, and the CU-UP as a network entity to perform a user plane security operation,
wherein a plurality of security keys are generated by the determined one or more network entities, wherein the plurality of security keys generated change depending upon whether the HUB is the trusted area or non-trusted area, and wherein the generated plurality of security keys are shared with a user equipment (UE) for secure communication between the UE and the first network entity.

2. The method as claimed in claim 1,
wherein the determined one or more network entities includes the HUB and the CU-UP, the method further comprising:
deriving a first security key (KHUB) and a second security key (KCUUP) from an anchor key (KSEAF), based on a plurality of parameters;
generating a first integrity key (KHUBint) and a first ciphering key (KHUBenc) based on the derived first security key (KHUB); and
generating a second integrity key (KUPint) and a second ciphering key (KUPenc) based on the derived second security key (KCUUP).

3. The method as claimed in claim 2, further comprising:
transmitting the first security key (KHUB) and the second security key (KCUUP) to the UE via a signaling message,
wherein the signaling message includes information related to security configuration.

4. The method as claimed in claim 2, wherein the plurality of parameters includes at least one of a physical cell id (PCI), a length of the PCI, a length of an Absolute Radio Frequency Channel Number downlink (ARFCN-DL), a length of a next hop (NH), a HUB identification (ID), or a transmit receive point (TRP) ID.

5. The method as claimed in claim 2, wherein the first security key (KHUB) is a security key generated for the HUB in a serving network,
wherein the second security key (KCUUP) is a security key generated for the CU-UP in the serving network, and
wherein the generated first integrity key (KHUBint) and the generated second integrity key (KUPint) are the integrity keys generated for the control plane and user plane.

6. The method as claimed in claim 1, wherein the trusted area is an area with no security threats for the HUB.

7. A first network entity in a 6G communication network, the first network entity comprising:
a communication unit comprising communication circuitry; and
a processor, comprising processing circuitry, operably coupled with the communication unit and configured, individually and/or collectively, to:
determine whether a HUB is in a trusted area or a non-trusted area of the 6G communication network;
determine, when the HUB is in the trusted area, the HUB and a Central Unit User Plane (CU-UP) as network entities to perform a security operation, and one or more network functions (NFs) generating a control plane signaling message as network entities that do not perform the security operation for the control plane signaling message; and
determine, when the HUB is in the non-trusted area, the one or more NFs and the HUB as network entities to perform a control plane security operation, and the CU-UP as a network entity to perform a user plane security operation,
wherein a plurality of security keys are generated by the determined one or more network entities, wherein the plurality of security keys generated change depending upon whether the HUB is the trusted area or non-trusted area, and wherein the generated plurality of security keys are shared with a user equipment (UE) for secure communication between the UE and the first network entity.

8. The first network entity as claimed in claim 7,
wherein the determined one or more network entities includes the HUB and the CU-UP, and
wherein the at least one processor is further configured, individually and/or collectively, to:
derive a first security key (KHUB) and a second security key (KCUUP) from an anchor key (KSEAF), based on a plurality of parameters,
generate a first integrity key (KHUBint) and a first ciphering key (KHUBenc) based on the derived first security key (KHUB), and
generate a second integrity key (KUPint) and a second ciphering key (KUPenc) based on the derived second security key (KCUUP).

9. The first network entity as claimed in claim 8,
wherein the at least one processor is further configured, individually and/or collectively, to:
control the communication unit to transmit the first security key (KHUB) and the second security key (KCUUP) to the UE via a signaling message,
wherein the signaling message includes information related to security configuration.

10. The first network entity as claimed in claim 8, wherein the plurality of parameters includes at least one of a physical cell id (PCI), a length of the PCI, a length of an Absolute Radio Frequency Channel Number downlink (ARFCN-DL), a length of a next hop (NH), a HUB identification (ID), or a transmit receive point (TRP) ID.

11. The first network entity as claimed in claim 8, wherein the first security key (KHUB) is a security key generated for the HUB in a serving network, wherein the second security key (KCUUP) is a security key generated for the CU-UP in the serving network, and wherein the generated first integrity key (KHUBint) and the generated second integrity key (KUPint) are the integrity keys generated for the control plane and the user plane.

12. The first network entity as claimed in claim 7, wherein the trusted area is an area with no security threats for the HUB.

* * * * *